(12) United States Patent
Arakawa et al.

(10) Patent No.: US 8,228,605 B2
(45) Date of Patent: Jul. 24, 2012

(54) ANTI-VIBRATION ZOOM LENS OPTICS

(75) Inventors: Akio Arakawa, Saitama (JP); Lai Wei, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 13/016,045

(22) Filed: Jan. 28, 2011

(65) Prior Publication Data

US 2011/0188117 A1    Aug. 4, 2011

(30) Foreign Application Priority Data

Jan. 29, 2010    (JP) .................................. 2010-019059

(51) Int. Cl.
*G02B 27/64*    (2006.01)
*G02B 15/14*    (2006.01)

(52) U.S. Cl. ......... 359/557; 359/554; 359/676; 359/687

(58) Field of Classification Search .......... 359/554–557, 359/676–690
See application file for complete search history.

(56) References Cited

U.S. PATENT DOCUMENTS

| | | | | |
|---|---|---|---|---|
| 5,654,826 A | * | 8/1997 | Suzuki ........................... | 359/557 |
| 5,731,897 A | * | 3/1998 | Suzuki ........................... | 359/557 |
| 5,841,588 A | | 11/1998 | Suzuki et al. | |
| 6,124,972 A | | 9/2000 | Hayakawa et al. | |
| 6,373,639 B2 | | 4/2002 | Hayakawa et al. | |
| 6,563,643 B2 | | 5/2003 | Hayakawa et al. | |
| 6,646,803 B2 | | 11/2003 | Hayakawa et al. | |
| 6,693,750 B2 | * | 2/2004 | Sato .............................. | 359/687 |
| 6,891,680 B2 | * | 5/2005 | Sato .............................. | 359/687 |
| 7,158,315 B2 | * | 1/2007 | Shibayama .................... | 359/690 |
| 7,663,802 B2 | | 2/2010 | Mizuguchi | |
| 2001/0030809 A1 | | 10/2001 | Hayakawa et al. | |
| 2002/0060844 A1 | | 5/2002 | Hayakawa et al. | |
| 2002/0154409 A1 | | 10/2002 | Hayakawa et al. | |
| 2007/0183042 A1 | | 8/2007 | Mizuguchi | |

FOREIGN PATENT DOCUMENTS

| | | |
|---|---|---|
| JP | 08-062541 A | 3/1996 |
| JP | 10-133114 A | 5/1998 |
| JP | 2007-206542 A | 8/2007 |

* cited by examiner

*Primary Examiner* — Thong Nguyen
(74) *Attorney, Agent, or Firm* — Jacobson Holman PLLC

(57) ABSTRACT

Anti-vibration zoom lens optics of four lens groups where a unit associated with an aperture stop and an anti-vibration unit can be spaced apart from each other without interference between their driving mechanisms. The four groups include a leading, first lens group of positive refractivity, a succeeding second lens group of negative refractivity, a third lens group of positive refractivity, and a trailing, fourth lens group of positive refractivity all arranged in this order from the front end closest to the object to the rearmost. The fourth lens group include three subsets of lens pieces, a leading, first subset, a succeeding, second subset, and a trailing, third subset all arranged in this order from the front end closest to the object to the rearmost, and the second subset of lens pieces are moved perpendicular to the optical axis to compensate for blur in the imaging plane.

6 Claims, 22 Drawing Sheets

ANTI-VIBRATION ZOOM LENS OPTICS

BACKGROUND OF THE INVENTION

1. Field of the Invention

The present invention relates to anti-vibration zoom lens optics suitable for single-lens reflex cameras that use photographic film or charge-coupled device.

2. Description of Related Art Including Information Disclosed Under 37 CFR §§1.97 and 1.98

Some state-of-the-art inventions include zoom lenses with a zoom ratio as high as 4×, as set forth below.

Such zoom lenses are featured as having five groups of lens elements arranged in a sequence of positive, negative, positive, positive and negative in refractive power, or as having six groups of lenses arranged in a sequence of positive, negative, positive, negative, positive and negative, which respectively have their second lens groups displaced to compensate for vibration (see Patent Document 1 listed below).

Some other prior art zoom lenses are of 4.1 zoom ratio with five groups of lens elements arranged in a sequence of positive, negative, negative, positive and negative in refractive power, which have their respective fourth lens groups displaced for anti-vibration compensation (see Patent Document 2).

Another type of the prior art zoom lenses are of 3.5 zoom ratio with three groups of lens elements of positive, negative, and positive refractive power arranged in this order, which have their respective third lens groups displaced for anti-vibration compensation (see Patent Document 3).

PUBLICATIONS ON PRIOR ART PATENT INVENTIONS

Patent Document 1
Japanese Preliminary Publication of Unexamined Patent Application No. H08-062541
Patent Document 2
Japanese Preliminary Publication of Unexamined Patent Application No. H10-133114
Patent Document 3
Japanese Preliminary Publication of Unexamined Patent Application No. 2007-206542

The prior art embodiments as disclosed in the above-identified Patent Documents 1 and 2 are disadvantageous in that the lens group displaced to compensate for vibration typically has an effective aperture as long as 25 mm or even greater, which unavoidably causes increased dimensions of the anti-vibration mechanism, and this in turn hampers an attempt to downsize the zoom lens itself. In addition, there are five or more of the lens groups, and this results in the zooming mechanism being complicated.

The prior art embodiments as disclosed in Patent Document 3 are devised to displace the third lens group for anti-vibration compensation so that among the leading or first subset of lens pieces 3-1 of positive refractive power and the trailing subsets of lens pieces 3-2 and 3-3 of negative refractive power in the third lens group, only the subset of lens pieces 3-2 are moved perpendicular to the optical axis. In this manner, however, a unit associated with an aperture stop settled in relation with the third lens group is in a location close to the anti-vibration unit, resulting in components for driving the aperture stop and those dedicated to the anti-vibration operation in both the units interfering with each other, and in order to address this trouble, the design of the lens barrel housing these optics must be complicated.

BRIEF SUMMARY OF THE INVENTION

The present invention is made to overcome such disadvantages as mentioned above in conjunction with the prior art anti-vibration feature incorporated zoom lenses having a zoom ratio as high as 4×, and accordingly, it is an object of the present invention to provide an anti-vibration zoom lens optics having four groups of lens pieces where one lens group, which is displaceable for anti-vibration compensation, has a reduced effective aperture so that an anti-vibration mechanism can afford to be downsized, and since there are only four of the lens groups, the design of the lens barrel housing them is not complicated.

It is another object of the present invention to provide an improved anti-vibration zoom lens optics in which a unit associated with an aperture stop and an anti-vibration unit are spaced apart from each other so as to prevent their respective driving mechanisms from interfering with each other.

An anti-vibration zoom lens optics according to the present invention has four groups of lens pieces, namely, the leading or first lens group of positive refractivity, the succeeding second lens group of negative refractivity, the third lens group of positive refractivity, and the trailing or fourth lens group of positive refractivity all arranged in this order from the front end closest to the object to the rearmost, where the fourth lens group include three subsets of lens pieces, namely, the leading or first subset, the succeeding or second subset, and the trailing or third subset all arranged in this order from the front end closest to the object to the rearmost, and the second subset of lens pieces are moved perpendicular to the optical axis to compensate for blur in the imaging plane.

The anti-vibration zoom lens optics according to the present invention has an enhanced capability of compensating for aberration and has one lens group, which is displaceable especially for anti-vibration compensation, reduced in effective aperture so as to attain a downsized anti-vibration mechanism, and additionally, the optics design only of four of the lens groups effectively avoids complicating the lens barrel mechanism.

The anti-vibration zoom lens optics according to the present invention has a unit associated with an aperture stop and an anti-vibration unit appropriately spaced apart from each other without interference between driving mechanisms for both the units.

In an aspect of the present invention, the zoom lens optics is designed to meet the requirements given in the following formulae:

$$1.1 < d41/d42 < 4.5 \tag{1}$$

$$0 < f4 \tag{2}$$

where d41 is a clearance filled with air between the first and second subsets of lens pieces in the fourth lens group, d42 is the clearance filled with air between the second and third subsets of lens pieces in the fourth lens group, and f4 is a focal length of the fourth lens group.

In another aspect of the present invention, the first subset of lens pieces in the fourth lens group has positive refractivity.

In still another aspect of the present invention, the first subset of lens pieces in the fourth lens group include two or more lens pieces of positive refractivity, at least one of which is a composite lens mated with a lens piece of negative refractivity.

In yet another aspect of the present invention, the first lens group include at least one of the lens pieces of positive refractivity that has an Abbe number of 80 or more.

In still another aspect of the present invention, the lens optics attains an effect of reducing chromatic aberration at the telephoto end during the zooming operation. Specifically, with at least one of the positive-refractivity lens pieces having an Abbe number of 80 or less, the lens optics encounters a problem with color drift that results from an increase in longitudinal chromatic aberration and/or chromatic aberration of magnification.

In another aspect of the present invention, the zoom lens optics is designed to meet the requirements given in the following formulae:

$$-0.5 < f42/f43 < 0.2 \qquad (3)$$

$$-1.0 < f4/f43 < 4.0 \qquad (4)$$

where f4 is a focal length of the fourth lens group, f42 is the focal length of the second subset of lens pieces in the fourth lens group, and f43 is the focal length of the third subset of lens pieces in the fourth lens group.

In still another aspect of the present invention, the first lens group is spaced farther away from the second lens group in response to varied magnification power due to a change of the photographing mode from wide-angle to telephoto, and accordingly, the second and third lens groups come closer to each other while the third and fourth lens groups move toward the object by different displacements therebetween.

DETAILED DESCRIPTION OF THE INVENTION

<Notes on the Graphs>

Regarding the graphs on spherical aberration in the accompanying drawings, the vertical axis is a scale indicating the relative height of beams incident on the entrance pupil.

In these graphs, curve A denotes the aberration at d-line (587.56 nm) while curve B denotes the aberration at g-line (435.83).

As for the graphs on astigmatism, the vertical axis is a scale indicating an image height (IMG HT). A solid line designates a sagittal direction passing from front to back while a broken line designates a medial direction.

In the graphs on distortion aberration, the vertical axis is a scale indicating the height of the image (IMG HT).

As with the graphs on comatic aberration, the horizontal axis is a scale indicating the height of beams incident on the entrance pupil. A solid line denotes the aberration at d-line (587.56 nm) while a broken line denotes that at g-line (435.83).

The present invention will now be described in the context of preferred embodiments with reference to the accompanying drawings.

Figure 1:
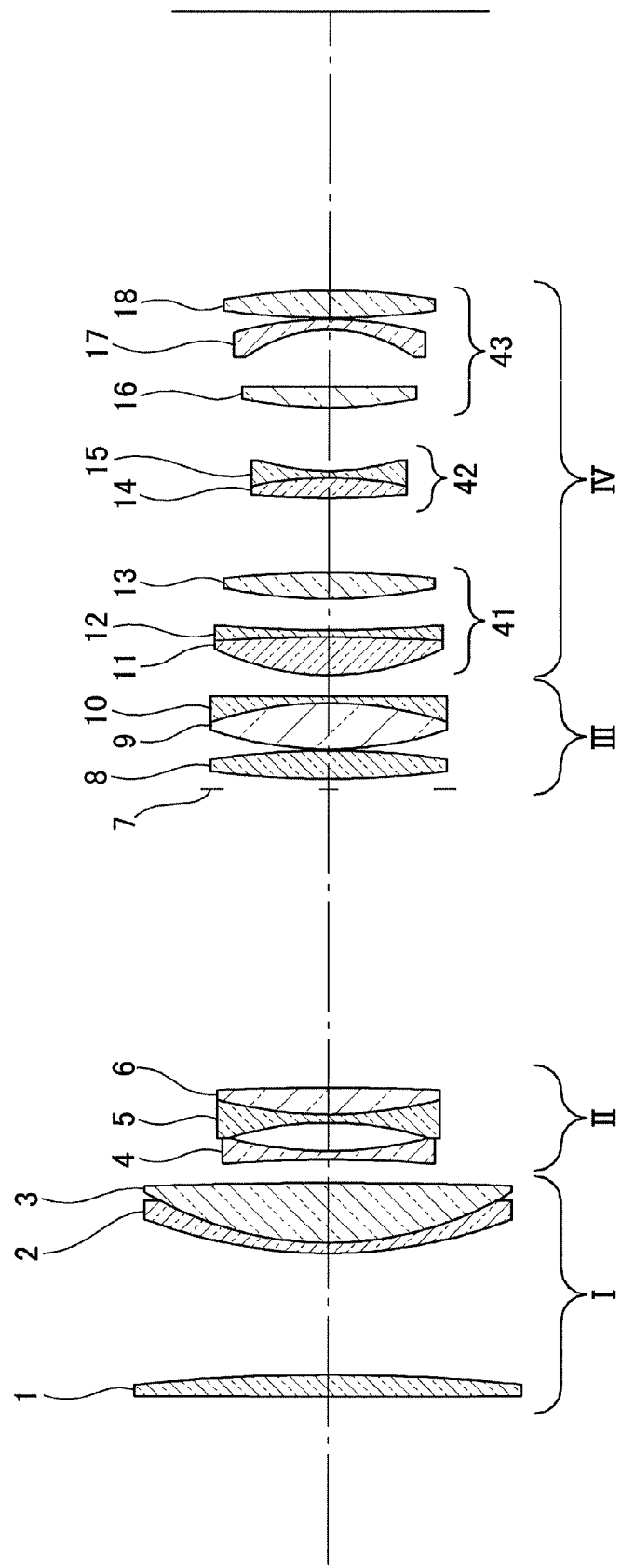
FIG. 1 is a sectional view showing a first embodiment of an anti-vibration zoom lens optics in accordance with the present invention.
Figure 2:
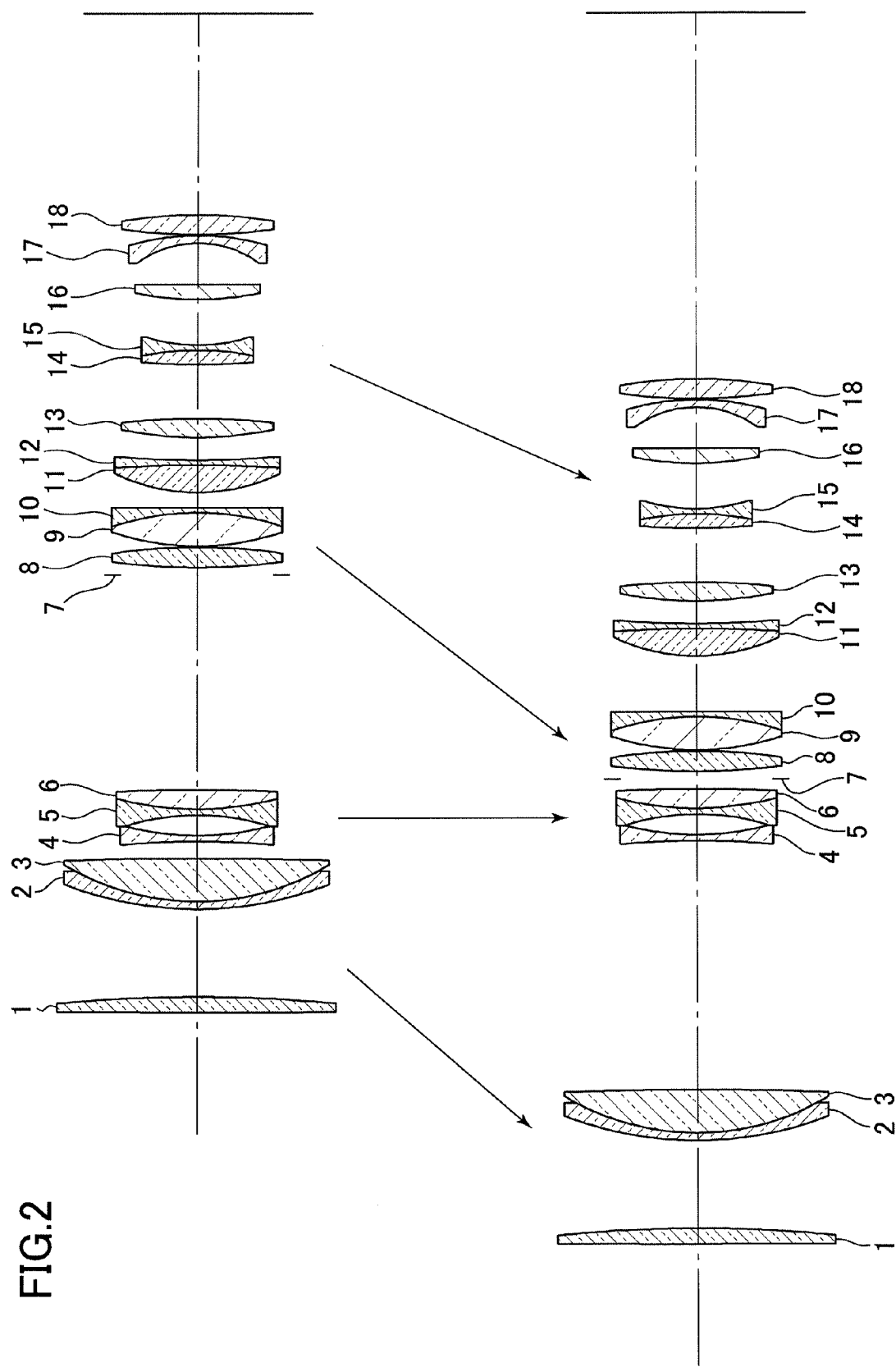
FIG. 2 is a diagram showing groups of lens pieces respectively displaced during the zooming operation in the first embodiment of the present invention.
Figure 3:
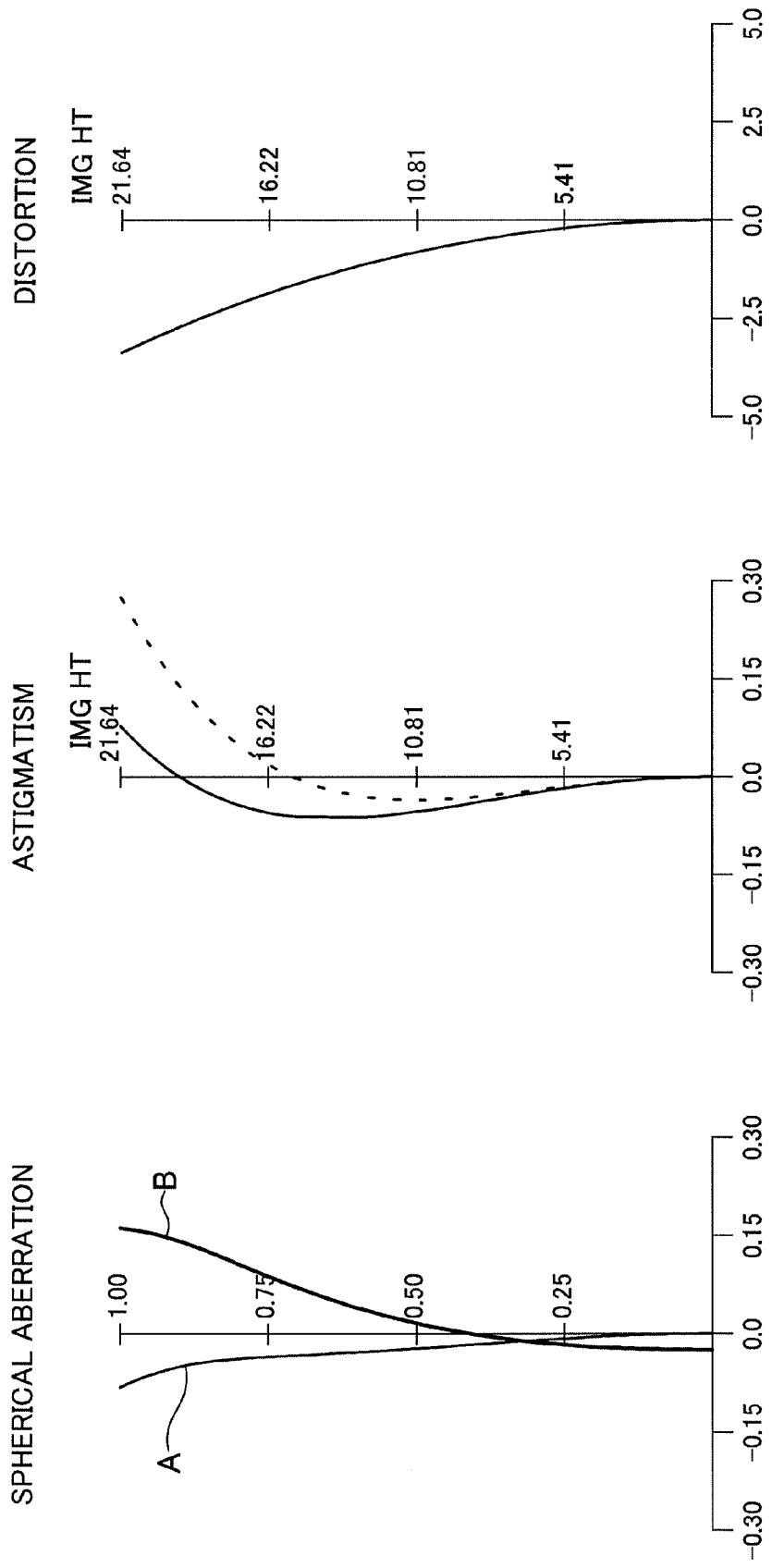
FIG. 3 shows graphs of spherical aberration, astigmatism, and distortion aberration at wide-angle in the first embodiment of the present invention.
Figure 4:
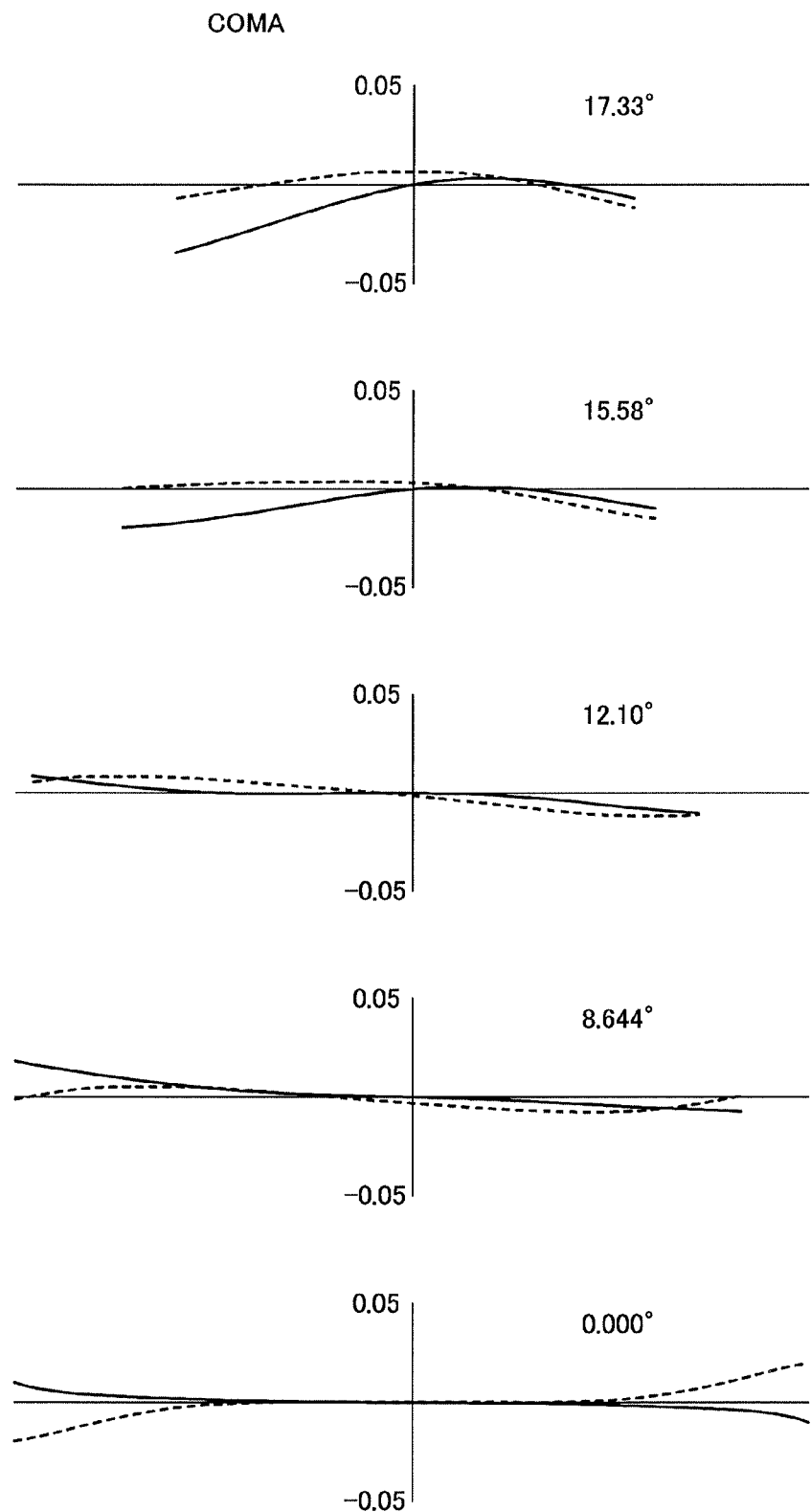
FIG. 4 shows graphs of comatic aberration at wide-angle in the first embodiment of the present invention.
Figure 5:
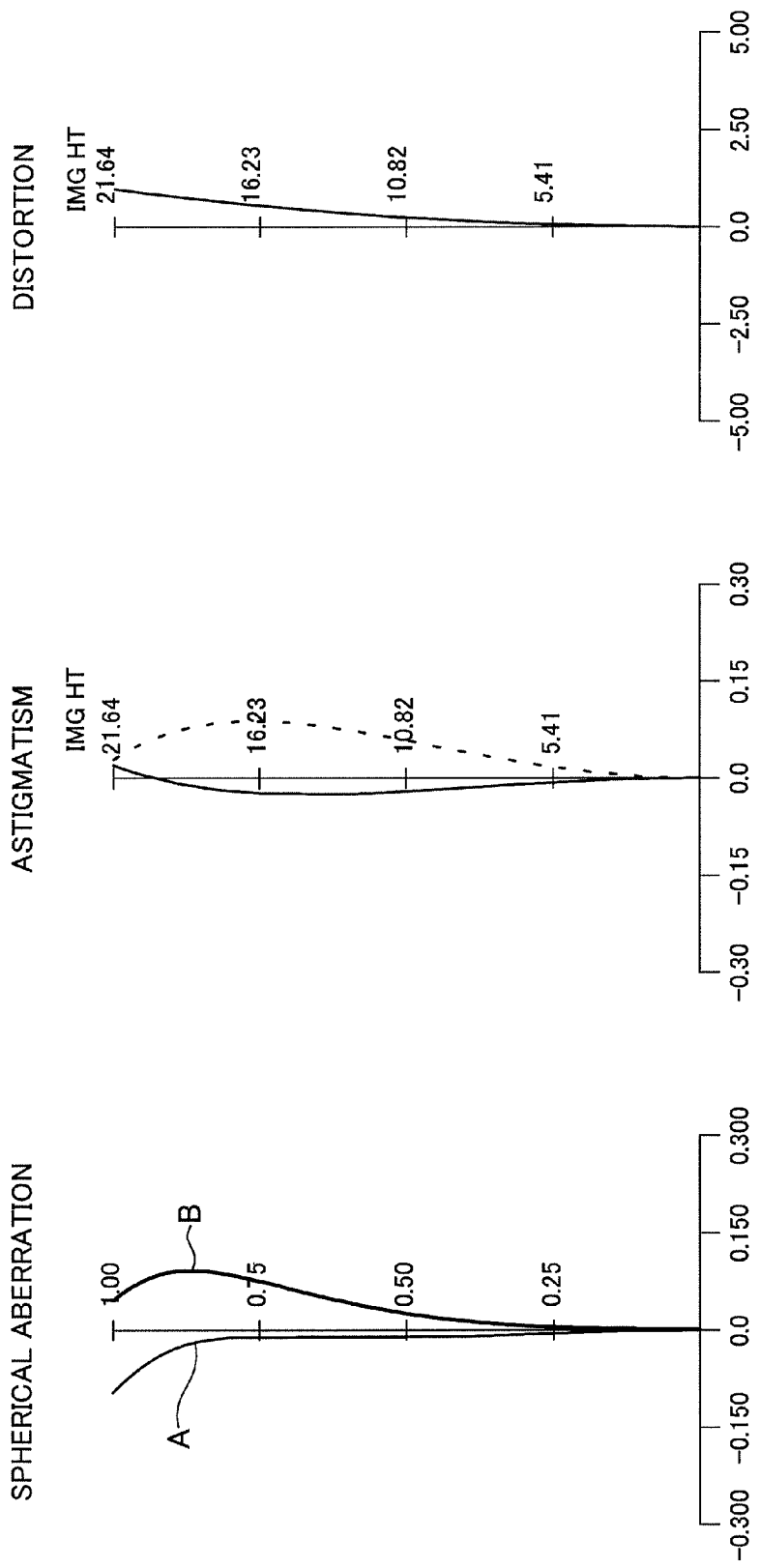
FIG. 5 shows graphs of spherical aberration, astigmatism, and distortion aberration at an intermediate zooming zone in the first embodiment of the present invention.
Figure 6:
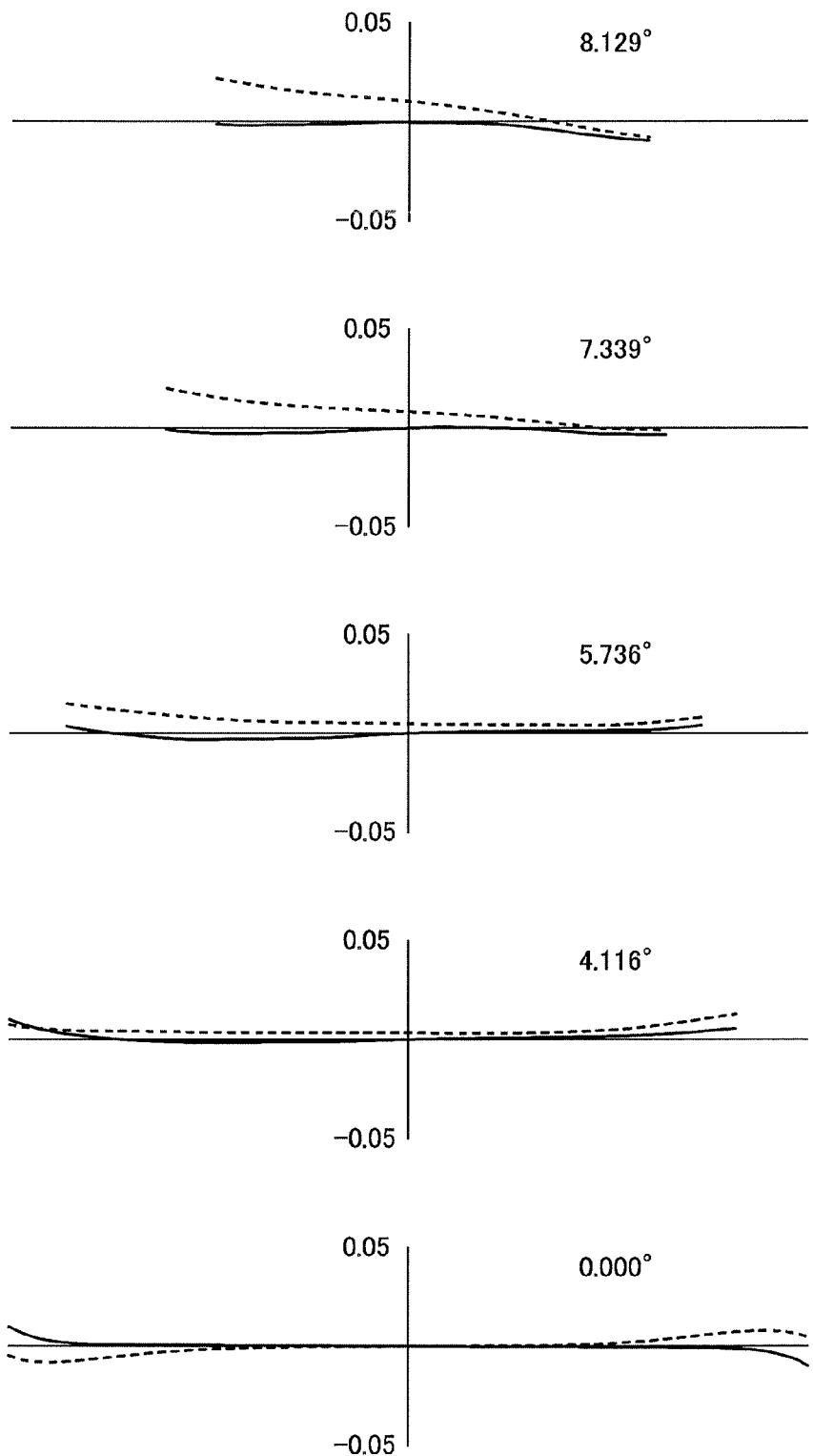
FIG. 6 shows graphs of comatic aberration at an intermediate zooming zone in the first embodiment of the present invention.
Figure 7:
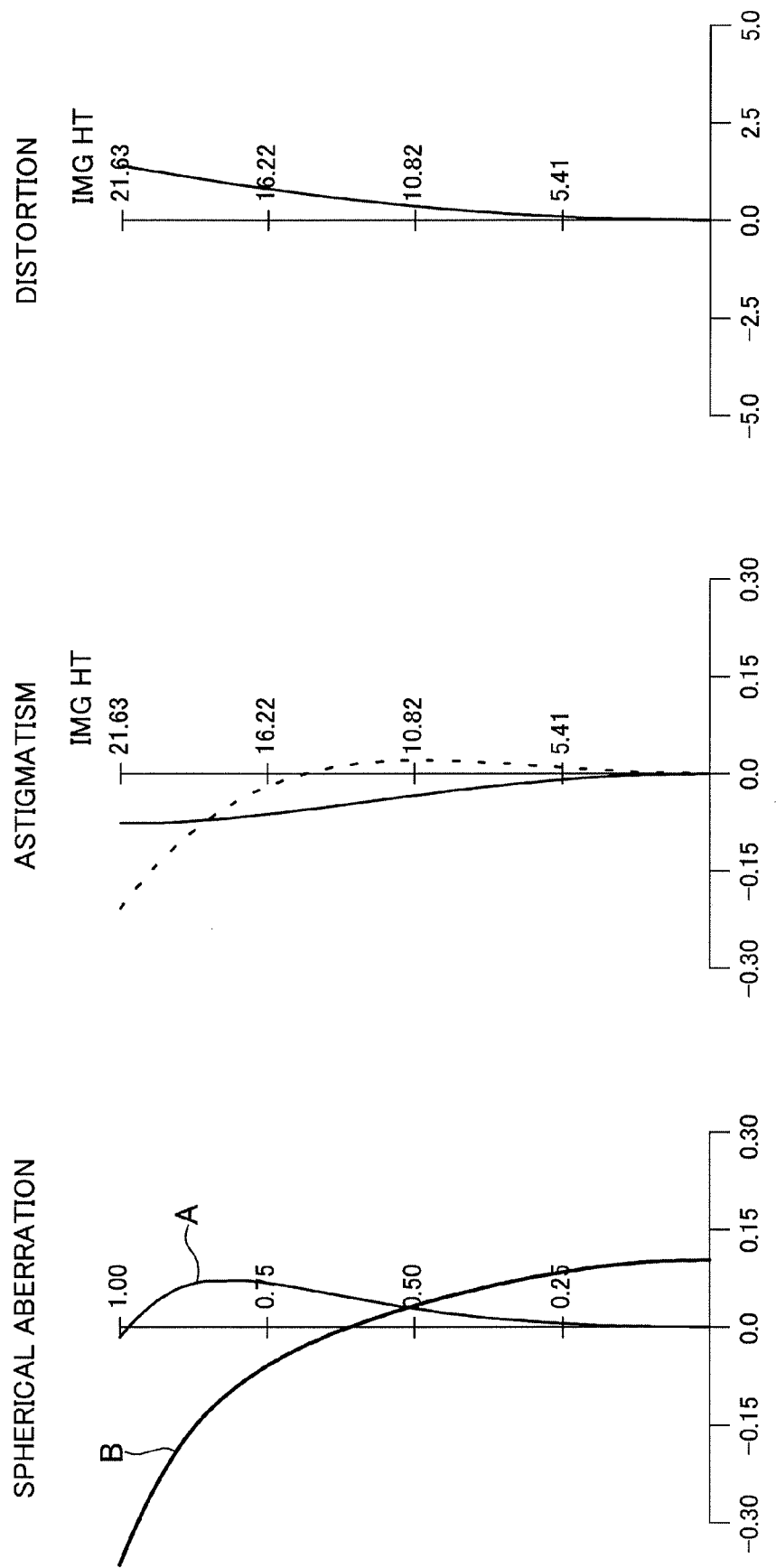
FIG. 7 shows graphs of spherical aberration, astigmatism, and distortion aberration at telephoto in the first embodiment of the present invention.
Figure 8:
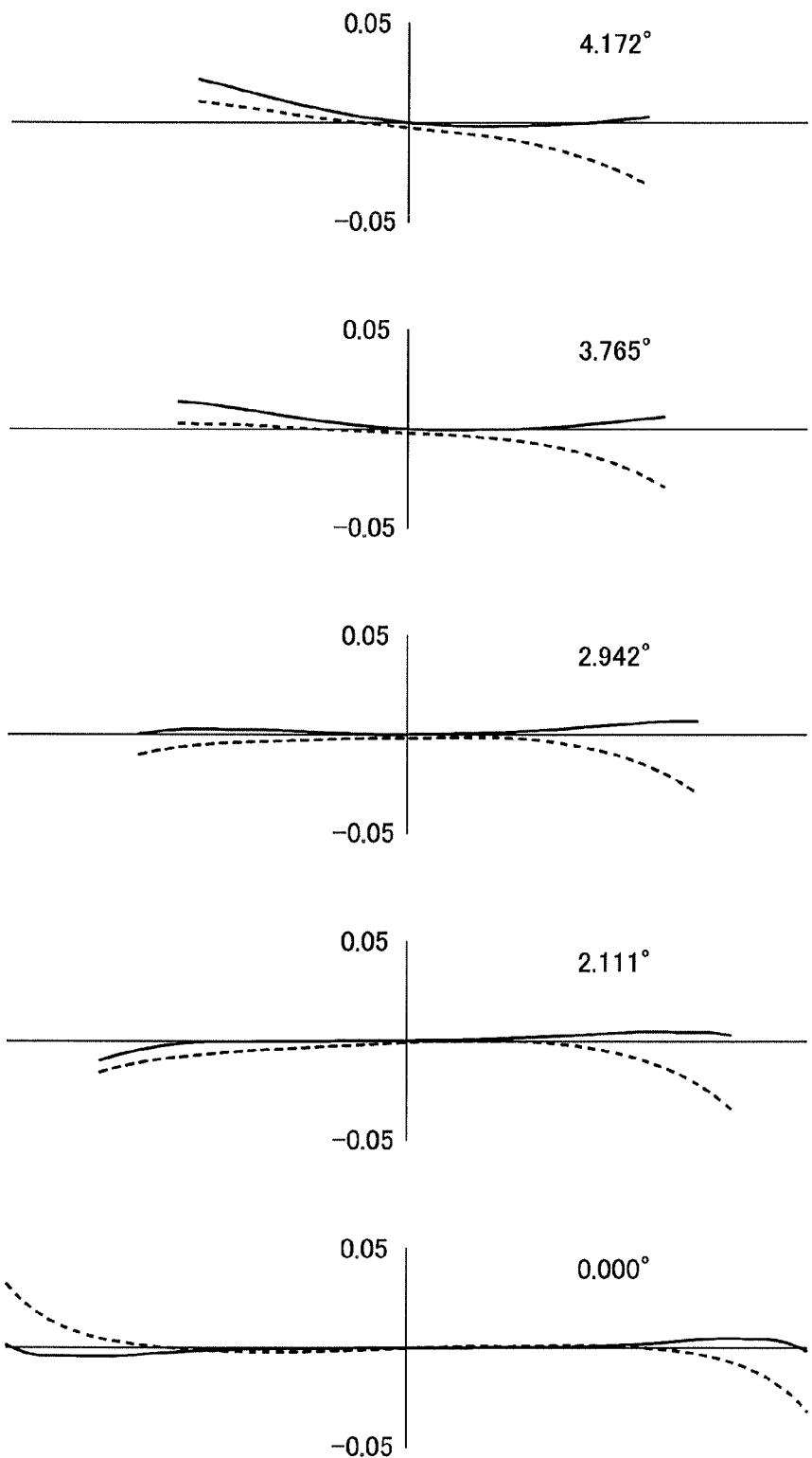
FIG. 8 shows graphs of comatic aberration at telephoto in the first embodiment of the present invention.
Figure 9:
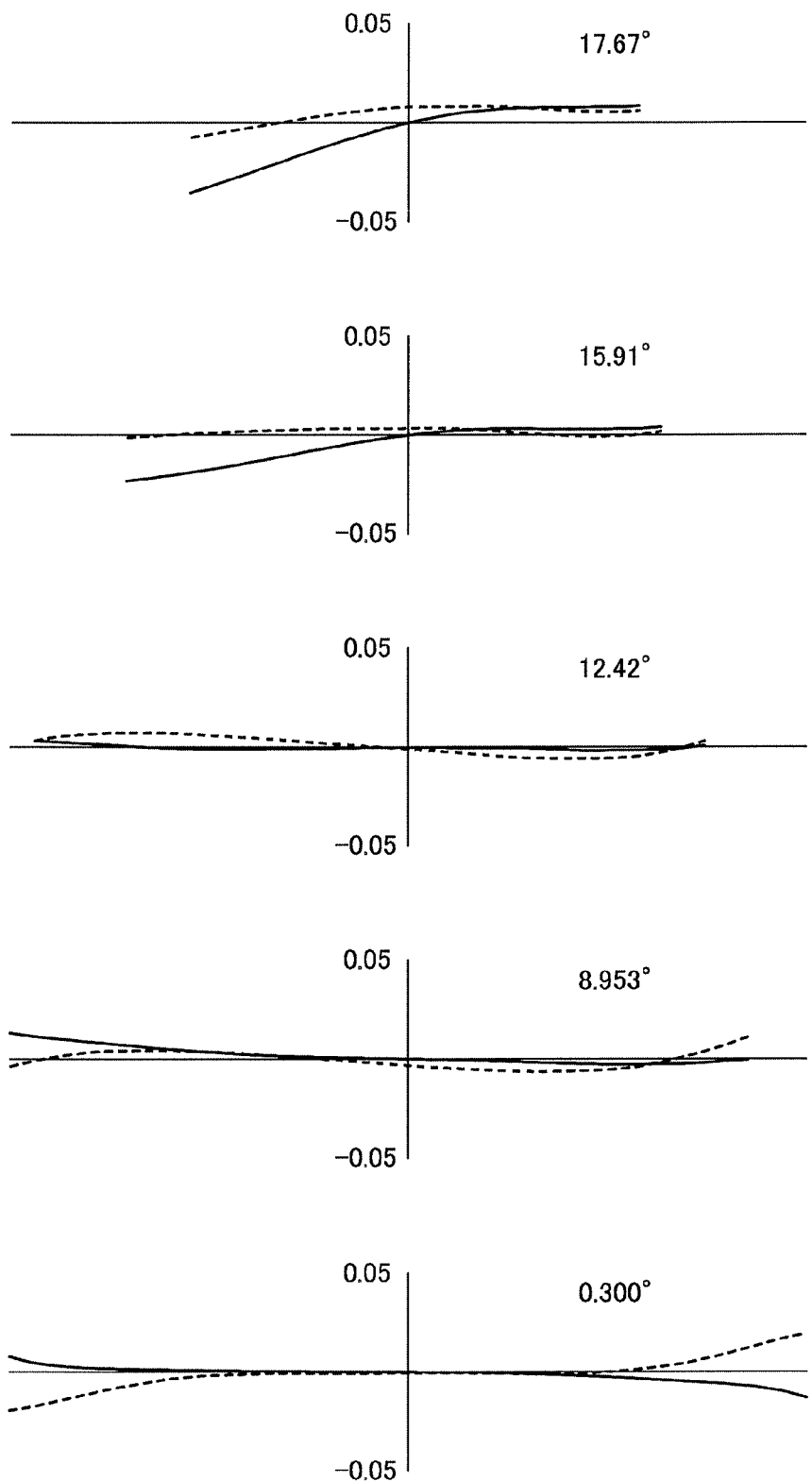
FIG. 9 shows graphs of comatic aberration at wide-angle in the first embodiment of the present invention (the anti-vibration lenses 14, 15 are upwardly shifted relative to the optical axis)
Figure 10:
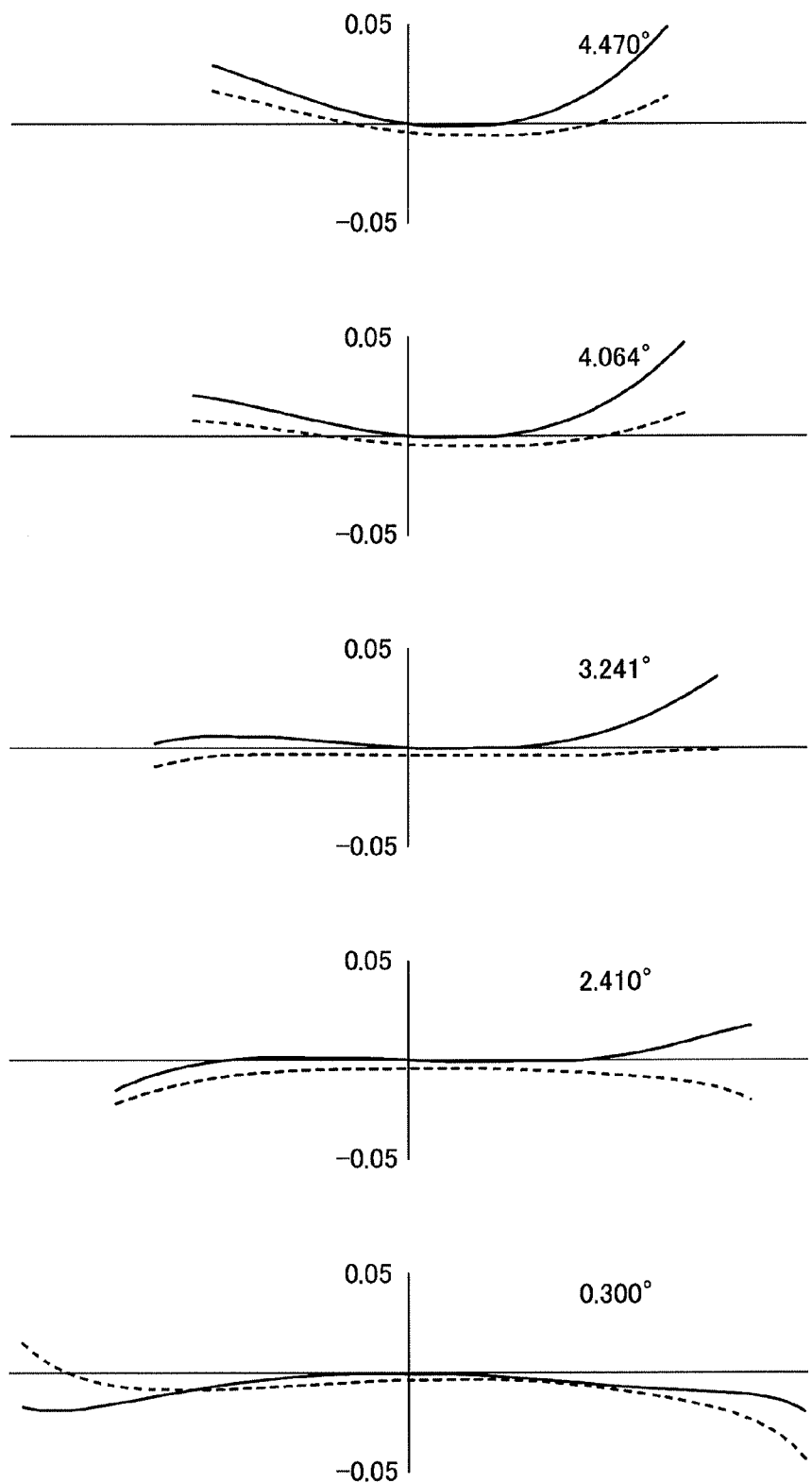
FIG. 10 shows graphs of comatic aberration at telephoto in the first embodiment of the present invention (the anti-vibration lenses 14, 15 are upwardly shifted relative to the optical axis)
Figure 11:
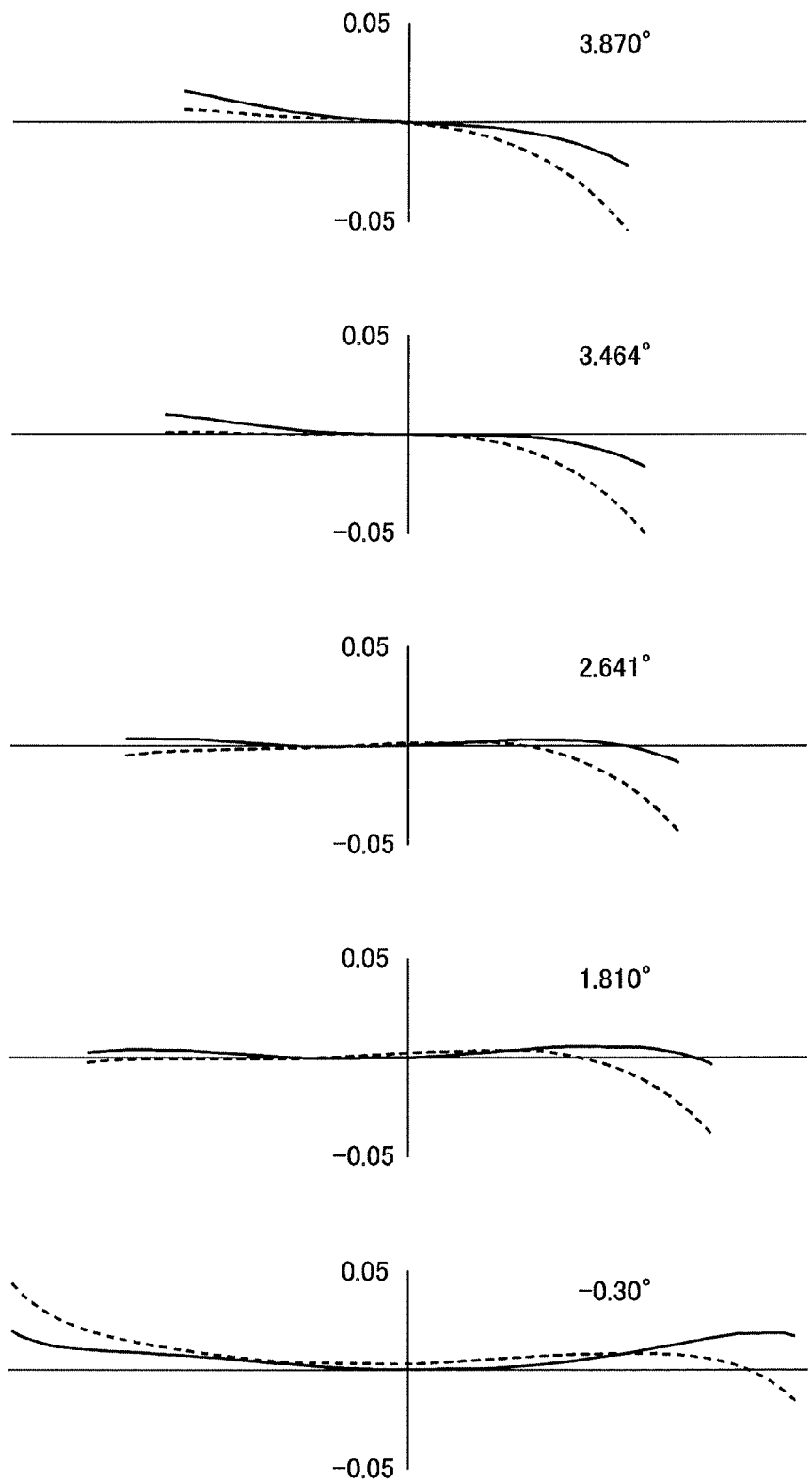
FIG. 11 shows graphs of comatic aberration at telephoto in the first embodiment of the present invention (the anti-vibration lenses 14, 15 are downwardly shifted relative to the optical axis)
Figure 12:
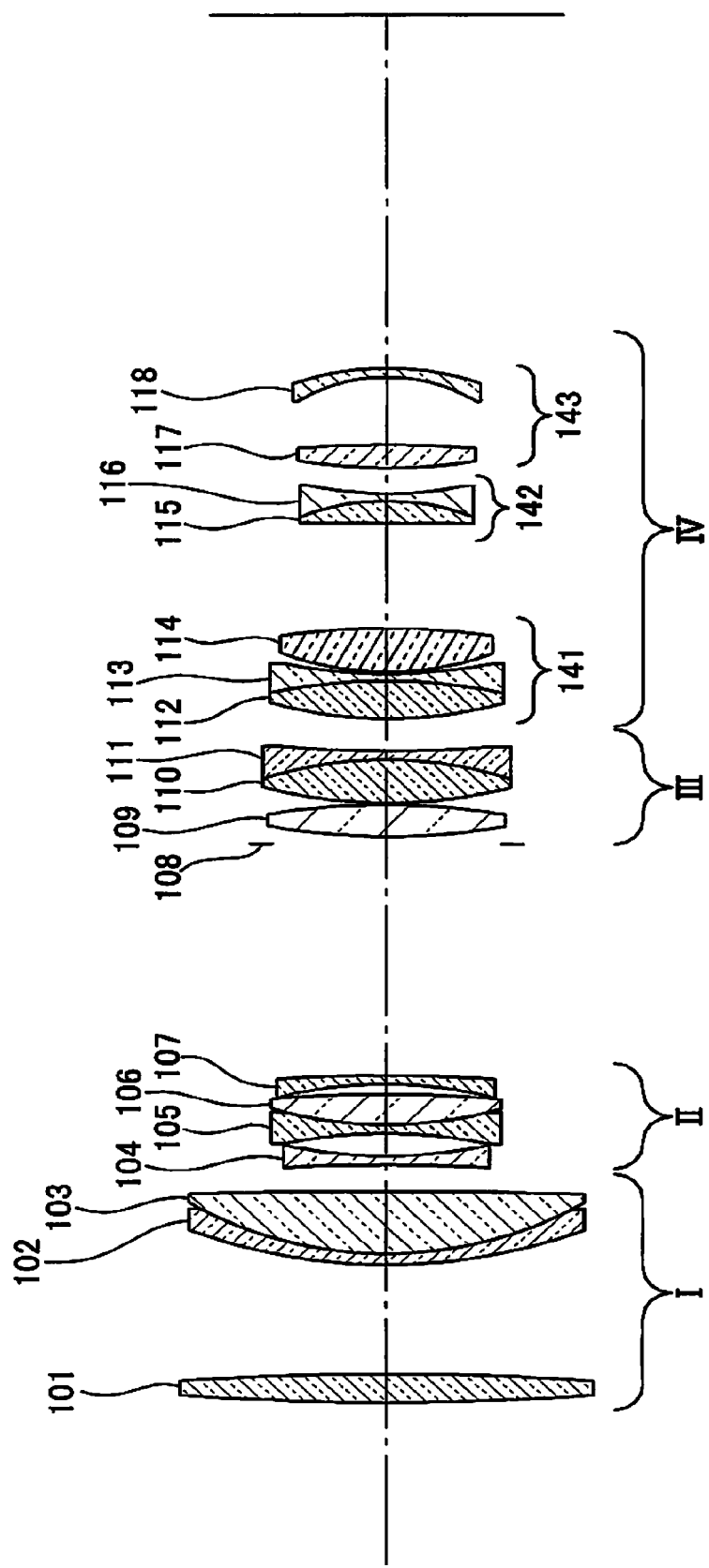
FIG. 12 is a sectional view showing groups of lens pieces in a second preferred embodiment of the anti-vibration zoom lens optics in accordance with the present invention.
Figure 13:
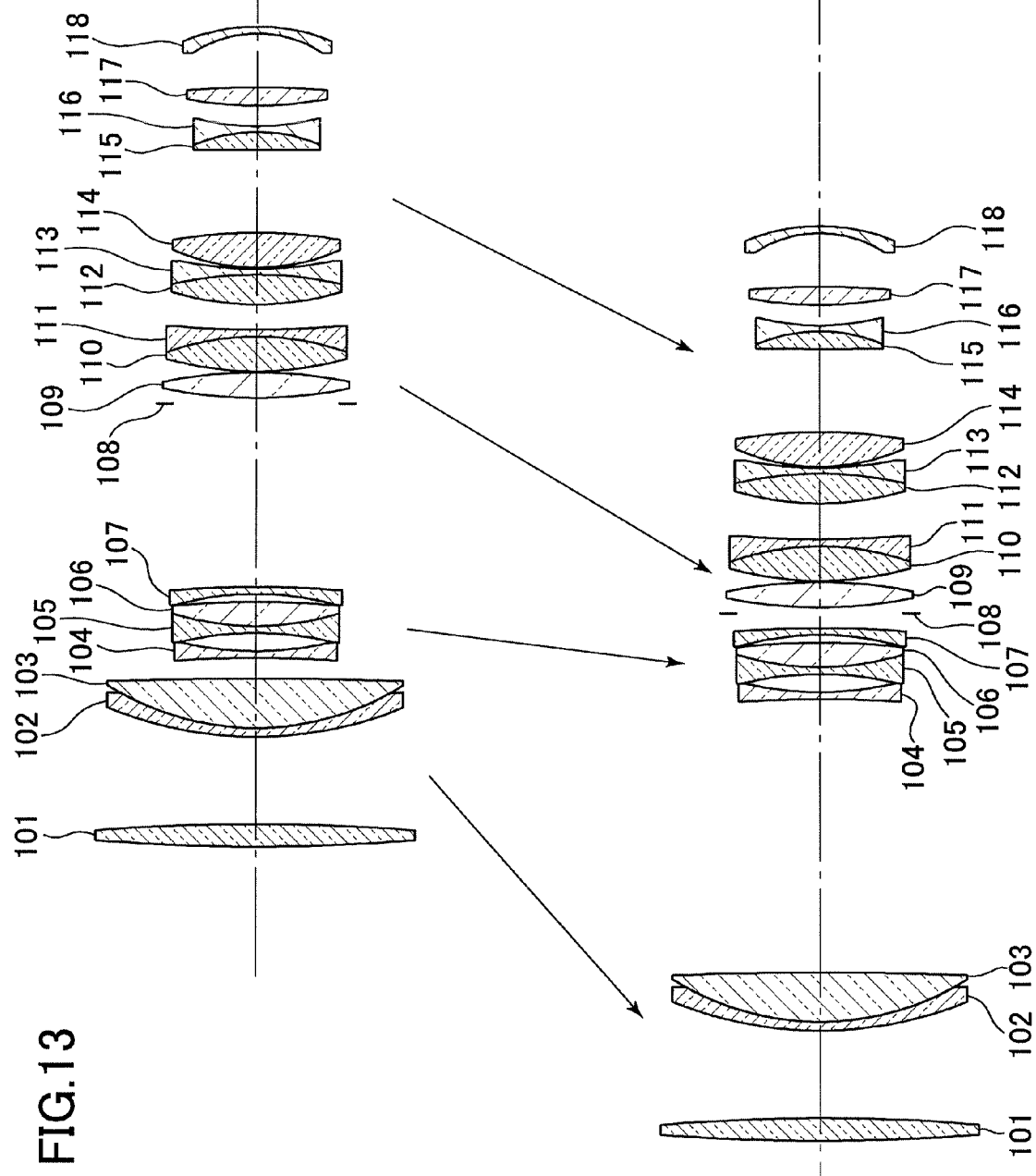
FIG. 13 is a diagram illustrating the groups of lens pieces respectively displaced during the zooming operation in the second embodiment of the present invention.
Figure 14:
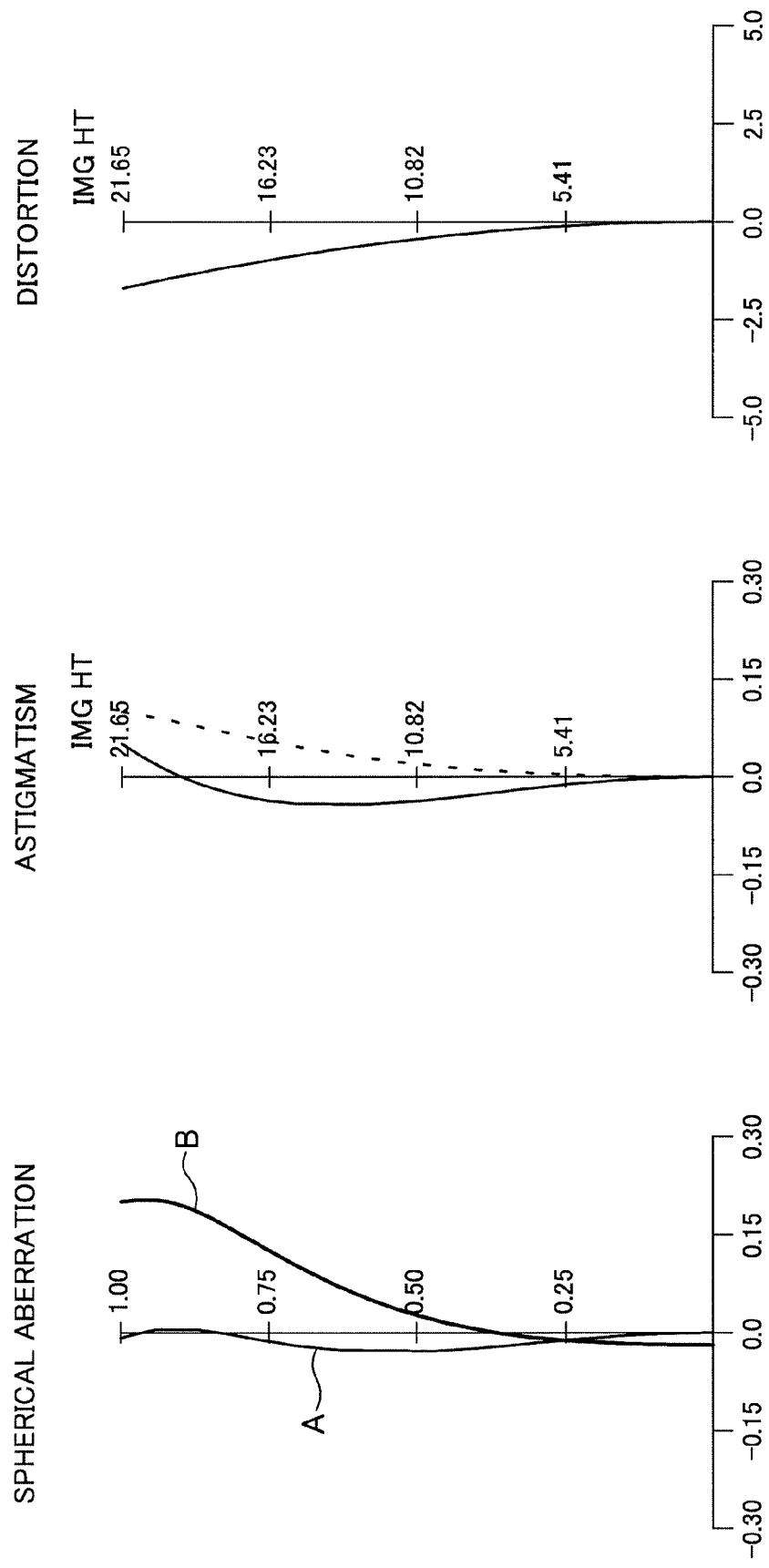
FIG. 14 shows graphs of spherical aberration, astigmatism, and distortion aberration at wide-angle in the second embodiment of the present invention.
Figure 15:
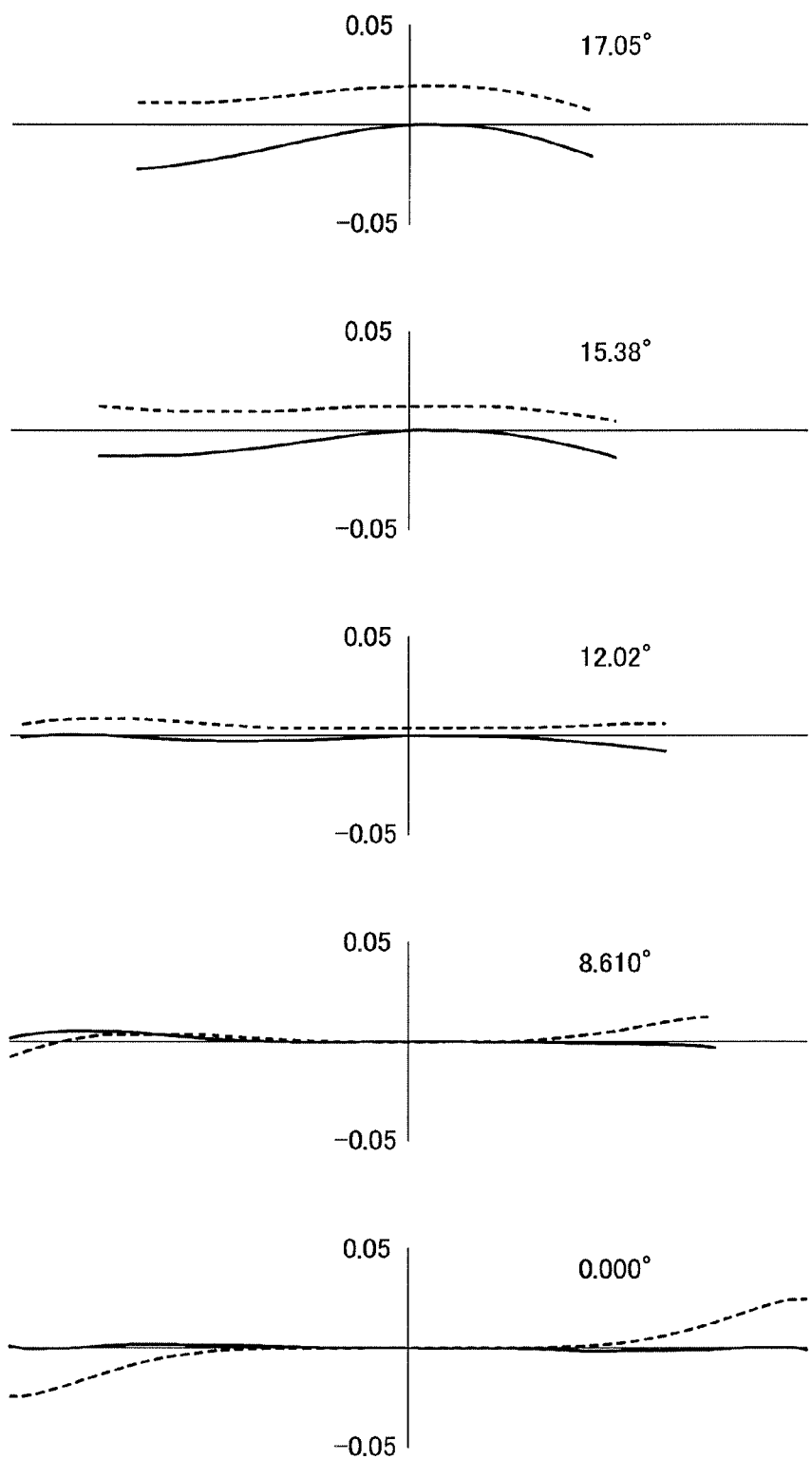
FIG. 15 shows graphs of comatic aberration at wide-angle in the second embodiment of the present invention.
Figure 16:
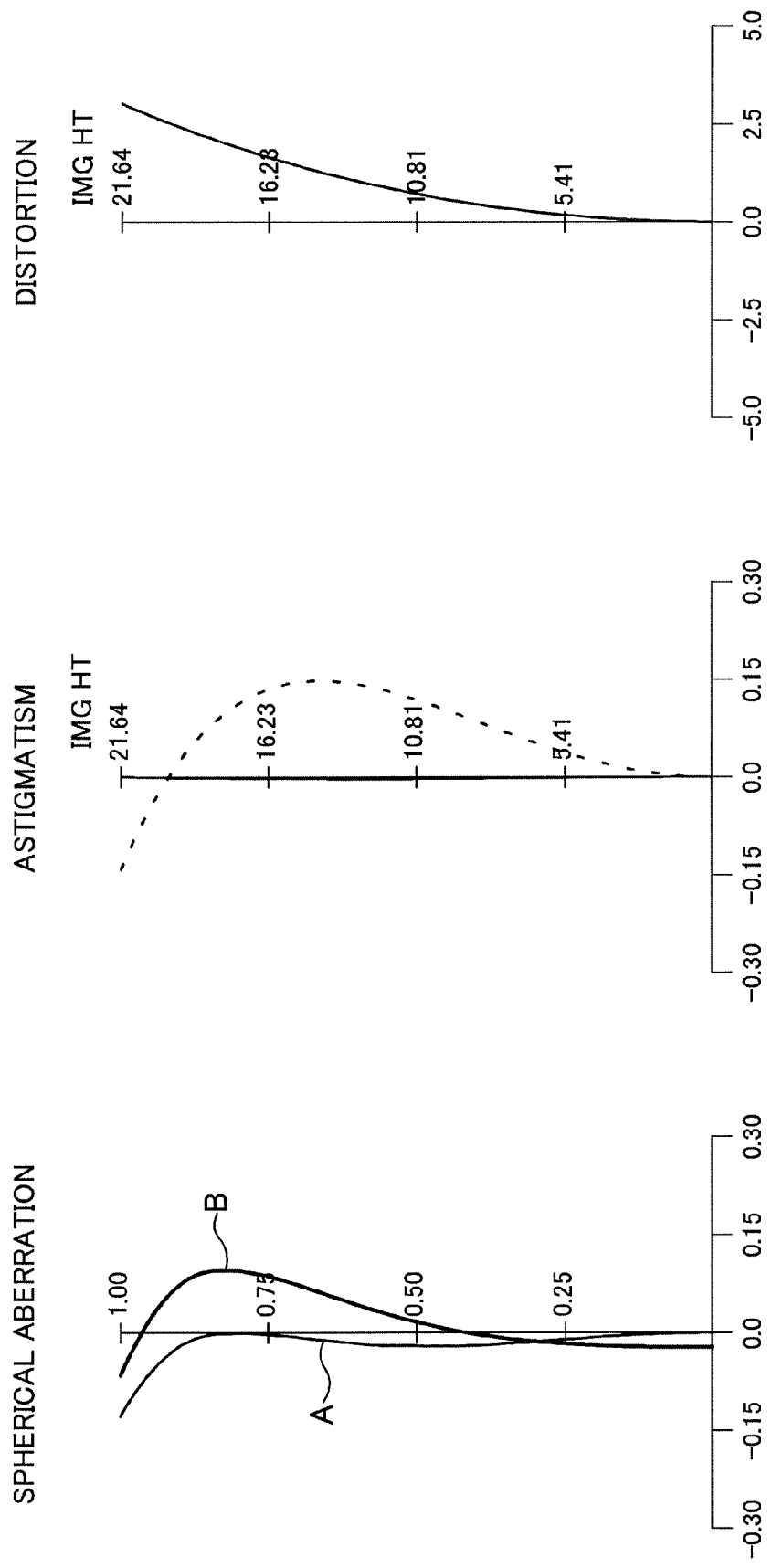
FIG. 16 shows graphs of spherical aberration, astigmatism, and distortion aberration at an intermediate zooming zone in the second embodiment of the present invention.
Figure 17:
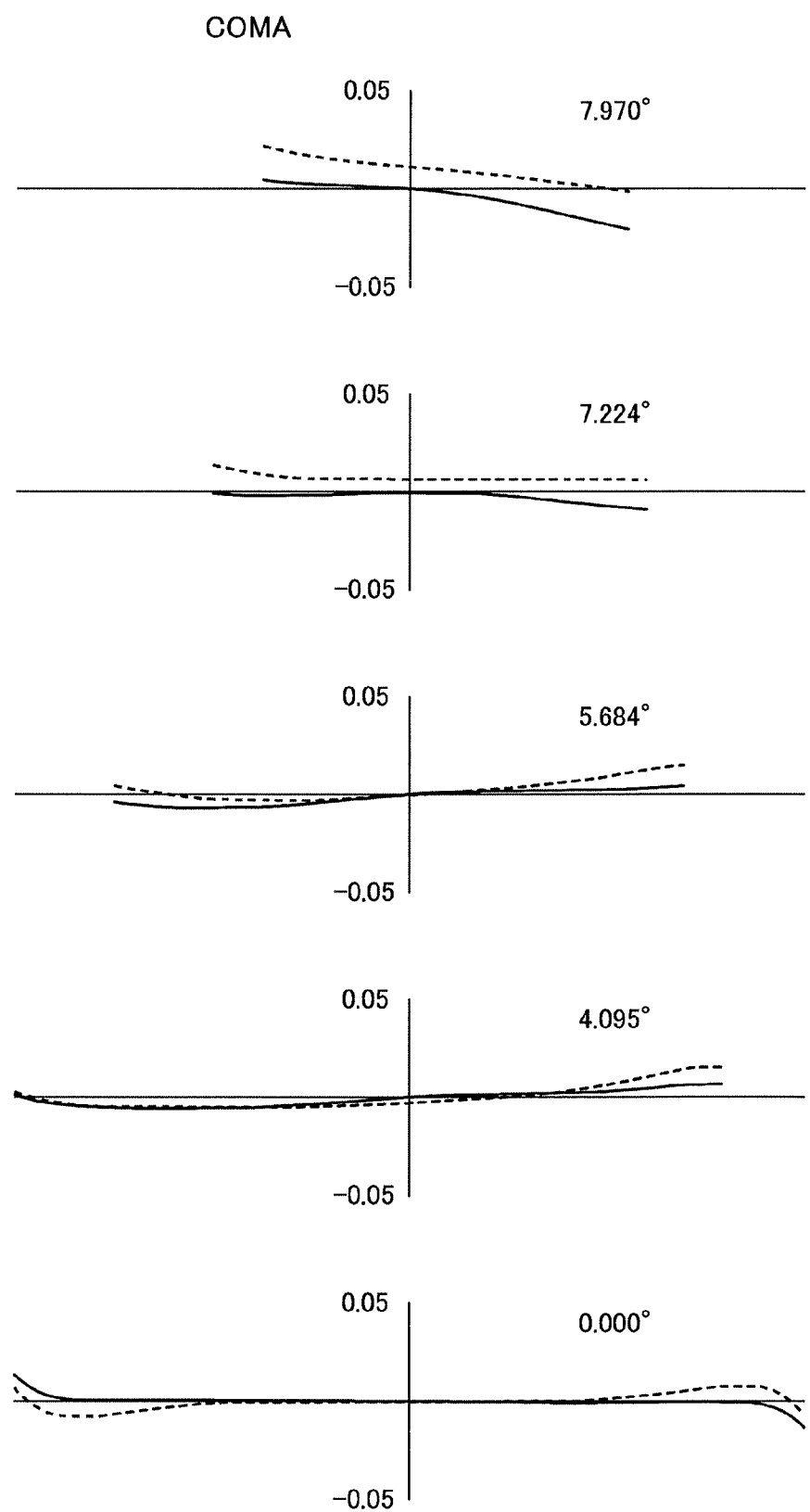
FIG. 17 shows graphs of comatic aberration at an intermediate zooming zone in the second embodiment of the present invention.
Figure 18:
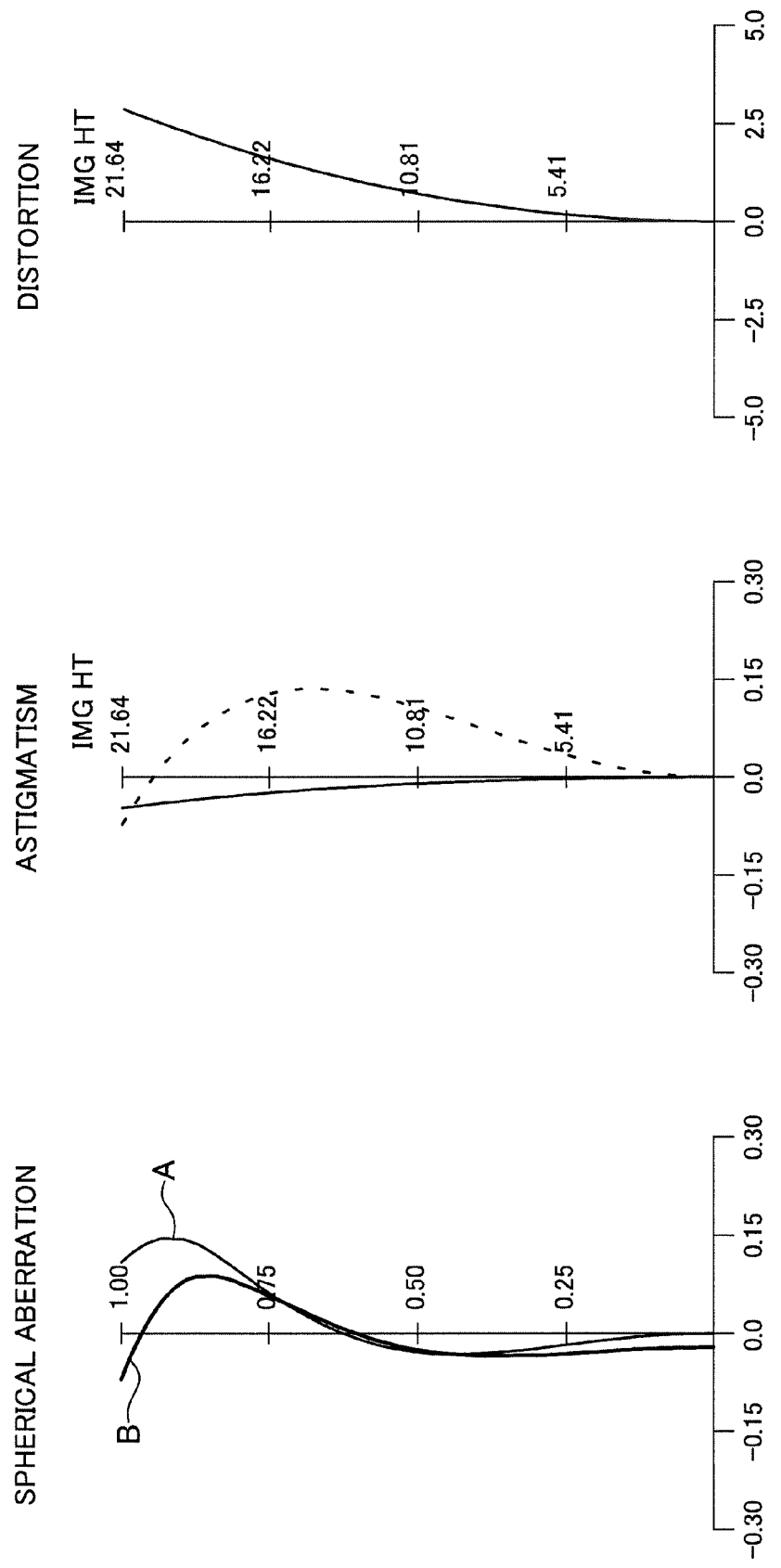
FIG. 18 shows graphs of spherical aberration, astigmatism, and distortion aberration at telephoto in the second embodiment of the present invention.
Figure 19:
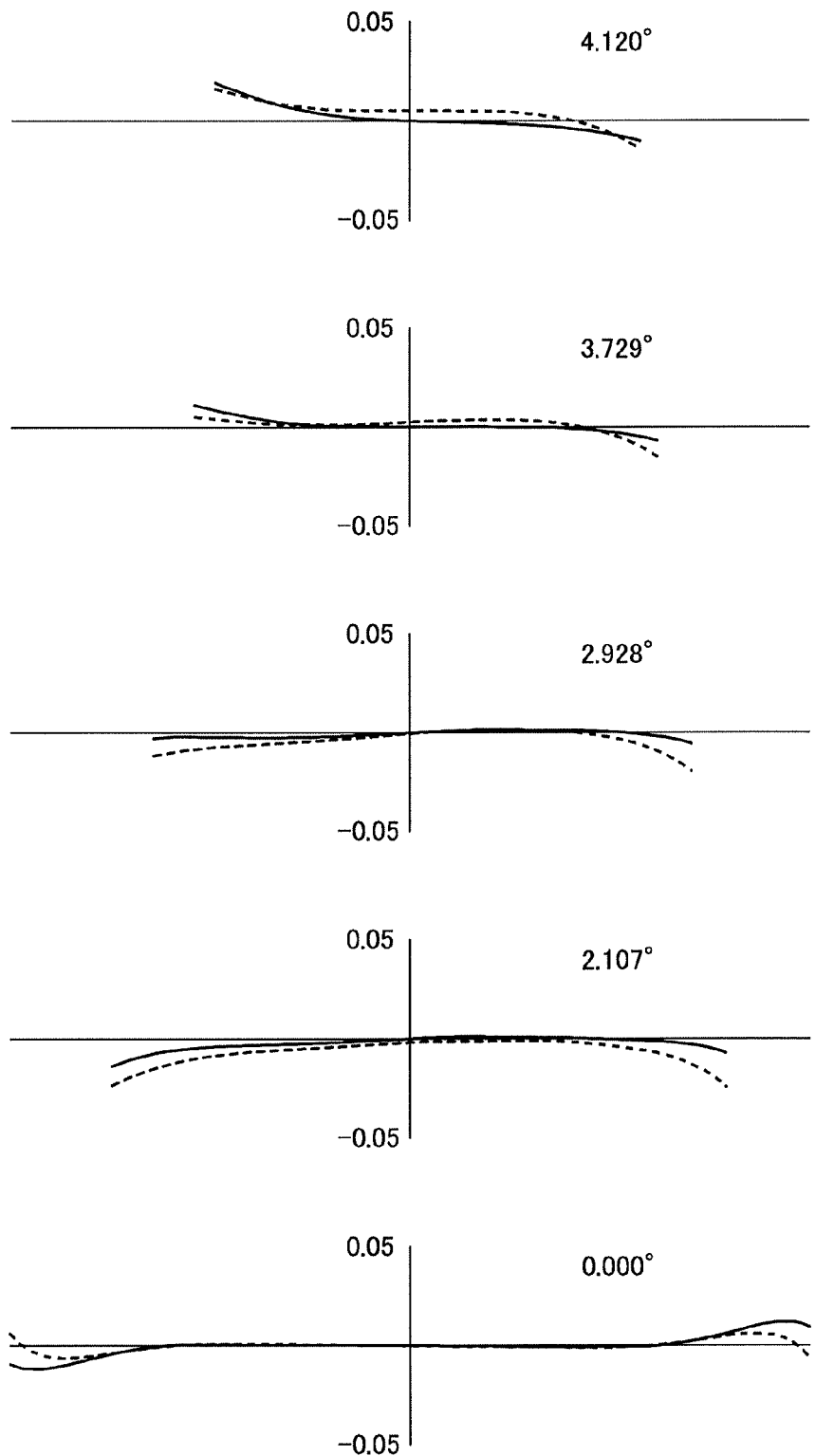
FIG. 19 shows graphs of comatic aberration at telephoto in the second embodiment of the present invention.
Figure 20:
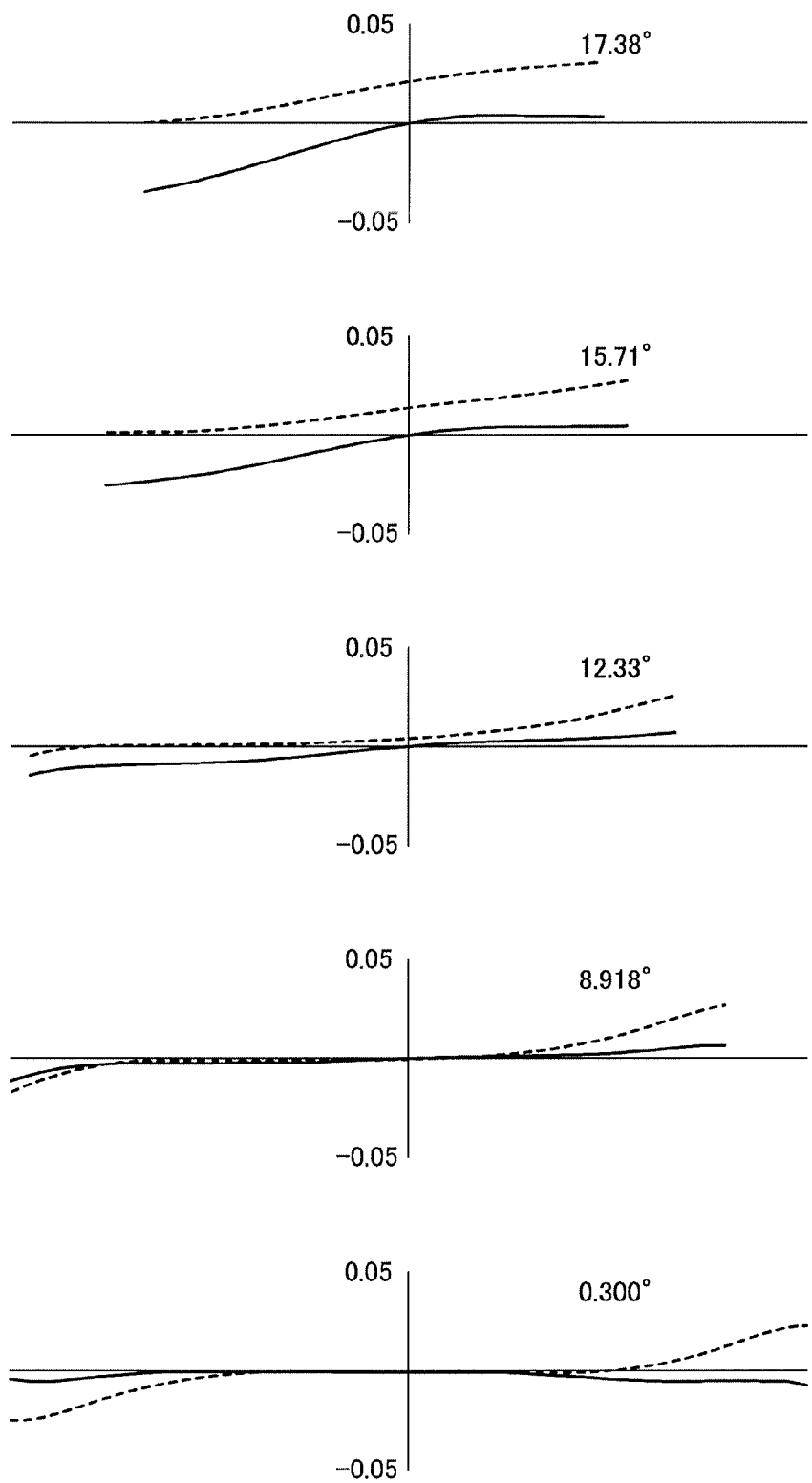
FIG. 20 shows graphs of comatic aberration at wide-angle in the second embodiment of the present invention (the anti-vibration lenses 115, 116 are upwardly shifted relative to the optical axis)
Figure 21:
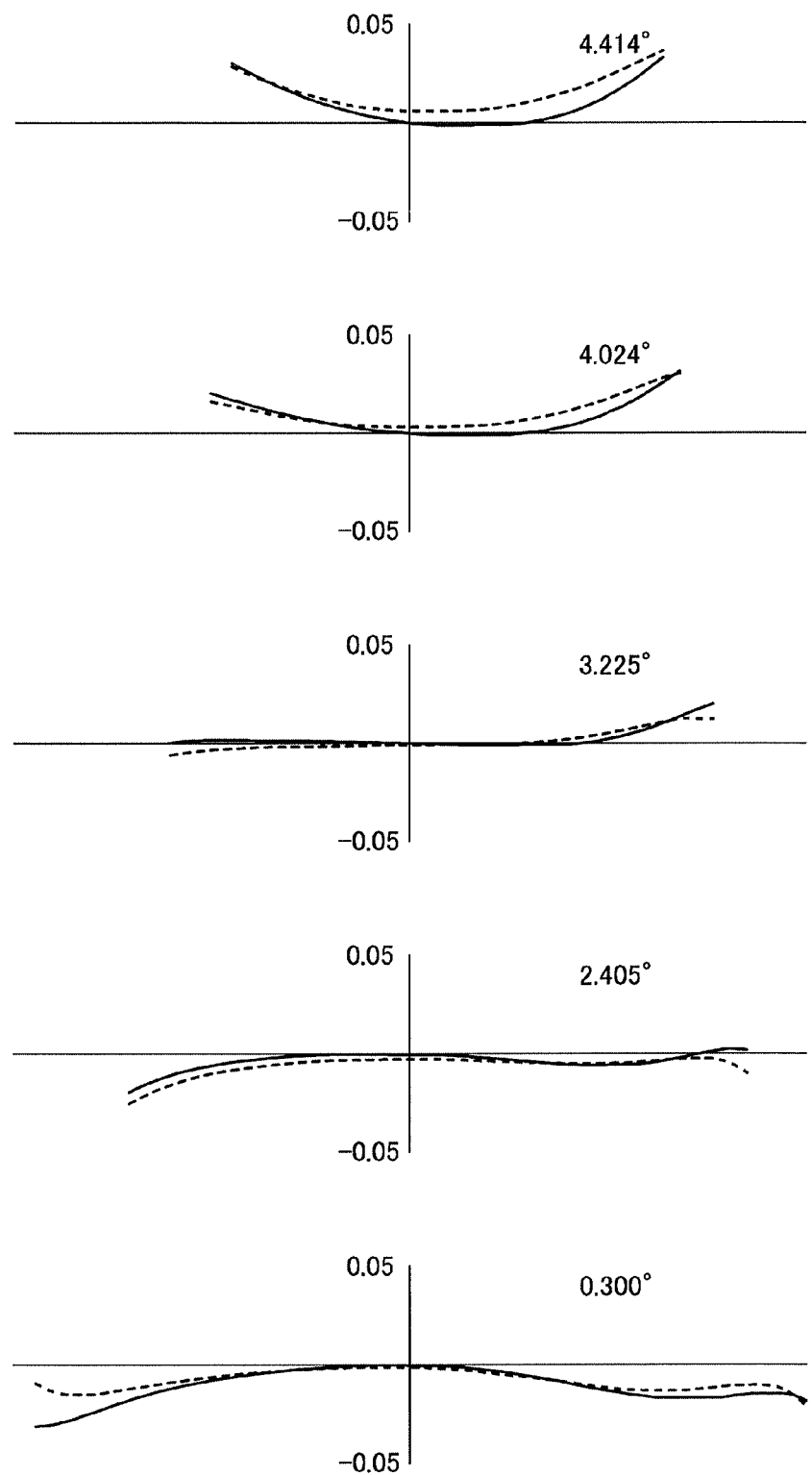
FIG. 21 shows graphs of comatic aberration at telephoto in the second embodiment of the present invention (the anti-vibration lenses 115, 116 are upwardly shifted relative to the optical axis)
Figure 22:
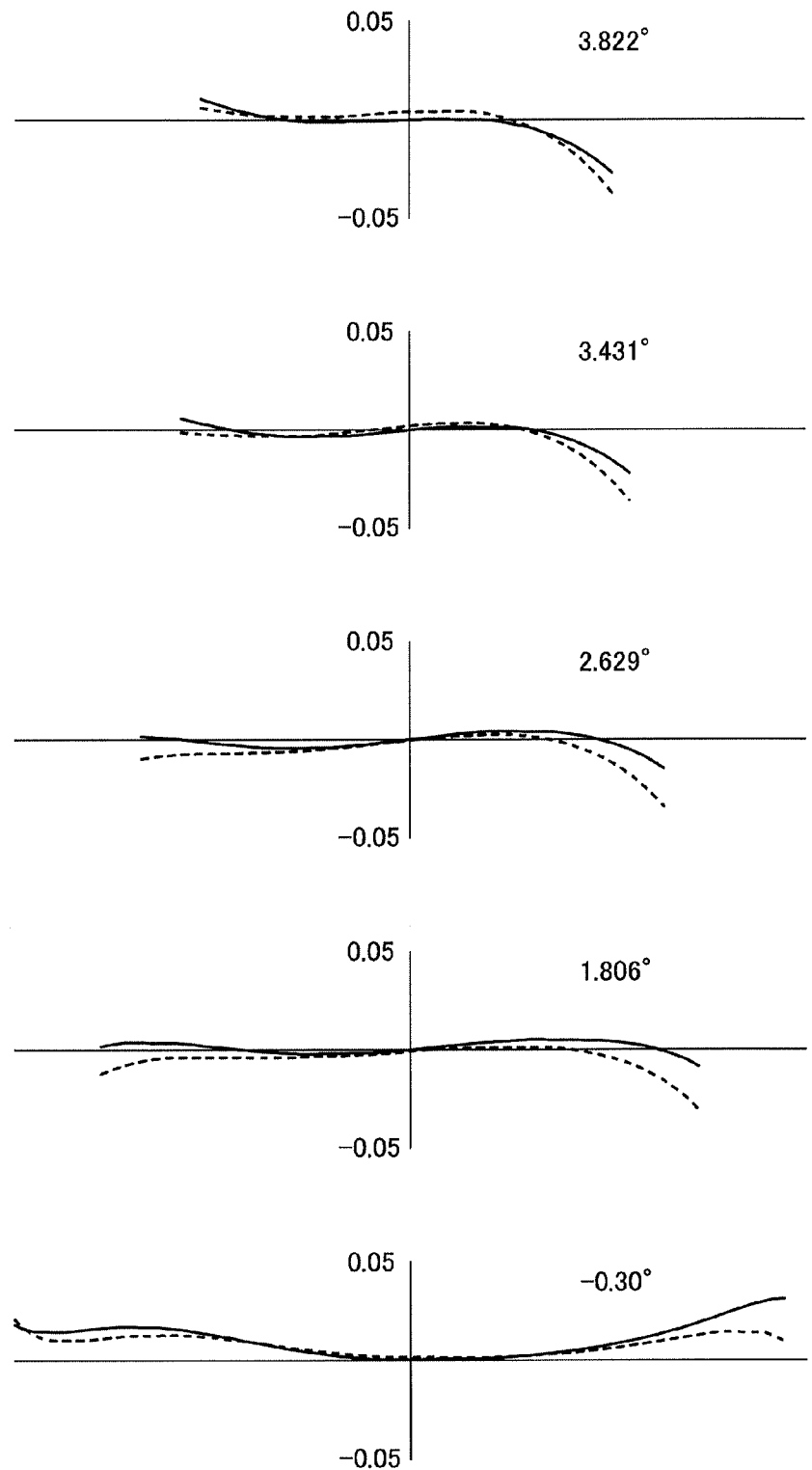
FIG. 22 shows graphs of comatic aberration at telephoto in the second embodiment of the present invention (the anti-vibration lenses 115, 116 are downwardly shifted relative to the optical axis).

The present invention in both of its embodiments as shown in FIGS. 1 and 2 and FIGS. 12 and 13 provides an anti-vibration zoom lens optics having four groups of lens pieces where one lens group, which is displaceable for anti-vibration compensation, has a reduced effective aperture so that an anti-vibration mechanism can afford to be downsized, and since there are only four of the lens groups, the design of the lens barrel housing them is not complicated.

The present invention in both of its embodiments also provides an improved anti-vibration zoom lens optics in which a unit associated with an aperture stop and an anti-vibration unit are spaced apart from each other so as to prevent their respective driving mechanisms from interfering with each other.

An anti-vibration zoom lens optics according to the present invention has four groups of lens pieces, namely, the leading or first lens group of positive refractivity, the succeeding second lens group of negative refractivity, the third lens group of positive refractivity, and the trailing or fourth lens group of positive refractivity all arranged in this order from the front end closest to the object to the rearmost, where the fourth lens group include three subsets of lens pieces, namely, the leading or first subset, the succeeding or second subset, and the trailing or third subset all arranged in this order from the front end closest to the object to the rearmost, and the second subset of lens pieces are moved perpendicular to the optical axis to compensate for blur in the imaging plane.

The anti-vibration zoom lens optics according to the present invention has an enhanced capability of compensating for aberration and has one lens group displaceable especially for anti-vibration compensation reduced in effective aperture so as to attain a downsized anti-vibration mechanism, and additionally, the optics design only of four of the lens groups effectively avoids complicating the lens barrel mechanism.

The anti-vibration zoom lens optics according to the present invention has a unit associated with an aperture stop and an anti-vibration unit appropriately spaced apart from each other without interference between driving mechanisms for both the units.

In an aspect of the present invention, the zoom lens optics is designed to meet the requirements given in the following formulae:

$$1.1 < d41/d42 < 4.5 \quad (1)$$

$$0 < f4 \quad (2)$$

where d41 is a clearance filled with air between the first and second subsets of lens pieces in the fourth lens group, d42 is the clearance filled with air between the second and third subsets of lens pieces in the fourth lens group, and f4 is a focal length of the fourth lens group.

Thus configured, the zoom lens optics more effectively brings about the enhanced capability of compensating for aberration as mentioned above, as well as the capabilities of reducing the effective aperture of the lens group displaceable for anti-vibration compensation to permit downsizing of the anti-vibration mechanism, and of avoiding complicating the lens mechanism by virtue of the optics design only of four of the lens groups where the unit associated with an aperture stop and the anti-vibration unit can be appropriately spaced apart from each other without interference between the driving mechanisms for both the units.

The formula (1) provides an appropriate location of the second subset of lens pieces in the fourth lens group. If exceeding the upper limit defined in the formula (1), the lens optics causes an increase in the entire length of the zoom lens, and results in the aperture stop and the second subset being significantly spaced apart from each other to cause difficulty in compensating for spherical aberration and comatic aberration. If exceeding the lower limit defined in the formula (1), the lens optics fails to reduce the effective aperture of the second subset of lens pieces in the fourth lens group, which results in increased dimensions of the anti-vibration mechanism and difficulty in compensating for spherical aberration and longitudinal chromatic aberration.

The formula (2) provides a positive focal length of the fourth lens group in which one of the subsets of lens pieces is dedicated for anti-vibration compensation. The fourth lens group has positive refractivity, as a whole, despite the first subset of lens pieces being of positive refractivity and the second subset being of negative refractivity, resulting in the second subset in the fourth lens group having an effective aperture smaller than the effective aperture of any of the first to third lens groups and the first subset in the fourth lens group, which advantageously permits the anti-vibration mechanism to be downsized, and in turn permits the entire zoom lens to be reduced in dimensions.

Since an optical member dedicated to anti-vibration compensation is incorporated as the second subset in the fourth lens group in a location farther away behind the aperture stop that is still ahead of the third lens group, a unit associated with the aperture stop such as an aperture driving motor can be disposed more independent of the location of the anti-vibration unit. Configured in this way, the lens optics develops reduced degradation of its imaging performance, that is, reduced comatic aberration, when the second subset of lens pieces in the fourth lens group are moved perpendicular to the optical axis.

In another aspect of the present invention, the first subset of lens pieces in the fourth lens group has positive refractivity.

Configured in this way, the lens optics more effectively brings about the enhanced capability of compensating for aberration as mentioned above, as well as the capabilities of reducing the effective aperture of the lens group displaceable for anti-vibration compensation to permit downsizing of the anti-vibration mechanism, and of avoiding complicating the lens mechanism by virtue of the optics design of only four of the lens groups where the unit associated with the aperture stop and the anti-vibration unit can be appropriately spaced apart from each other without interference between the driving mechanisms for both the units.

Thus configured, the lens optics effectively reduces varied comatic aberration especially during the anti-vibration motions of the lens elements.

In still another aspect of the present invention, the first subset of lens pieces in the fourth lens group include two or more lens pieces of positive refractivity, at least one of which is a composite lens mated with a lens piece of negative refractivity.

Configured in this way, the lens optics more effectively brings about the enhanced capability of compensating aberration as mentioned above, as well as the capabilities of reducing the effective aperture of the lens group displaceable for anti-vibration compensation to permit downsizing of the anti-vibration mechanism, and of avoiding complicating the lens mechanism by virtue of the optics design only of four of the lens groups where the unit associated with an aperture stop and the anti-vibration unit can be appropriately spaced apart from each other without interference between the driving mechanisms for both the units.

Thus configured, the lens optics has an additional effect of suppressing chromatic aberration of magnification.

In yet another aspect of the present invention, the first lens group include at least one of the lens pieces of positive refractivity that has an Abbe number of 80 or higher.

Configured in this manner, the lens optics more effectively brings about the enhanced capability of compensating aberration as mentioned above, as well as the capabilities of reducing the effective aperture of the lens group displaceable for anti-vibration compensation to permit downsizing of the anti-vibration mechanism, and of avoiding complicating the lens mechanism by virtue of the optics design of only four of the lens groups where the unit associated with an aperture stop and the anti-vibration unit can be appropriately spaced apart from each other without interference between the driving mechanisms for both the units.

In still another aspect of the present invention, the lens optics attains an effect of reducing chromatic aberration at the telephoto end during a zooming operation. Specifically, with at least one of the positive-refractivity lens pieces having an Abbe number of 80 or less, the lens optics encounters a problem of color drift that results from an increase in longitudinal chromatic aberration and/or chromatic aberration of magnification.

In another aspect of the present invention, the zoom lens optics is designed to meet the requirements given in the following formulae:

$$-0.5 < f42/f43 < 0.2 \quad (3)$$

$$-1.0 < f4/f43 < 4.0 \quad (4)$$

where f4 is a focal length of the fourth lens group, f42 is the focal length of the second subset of lens pieces in the fourth lens group, and f43 is the focal length of the third subset of lens pieces in the fourth lens group.

Thus configured, the zoom lens optics more effectively brings about the enhanced capability of compensating for aberration as mentioned above, as well as the capabilities of reducing the effective aperture of the lens group which is displaceable for anti-vibration compensation, to permit downsizing of the anti-vibration mechanism, and of avoiding complicating the lens mechanism by virtue of the optics design of only four of the lens groups where the unit associated with an aperture stop and the anti-vibration unit can be appropriately spaced apart from each other without interference between the driving mechanisms for both the units.

The formula (3) provides an appropriate range of the focal length of the second subset of lens pieces in the fourth lens group. If exceeding the upper limit defined in the formula (3), the second subset has its negative refractivity intensified, and this unavoidably causes a greater ratio of a displacement of the second subset to an image motion in the imaging plane during the compensation for image blur, which leads to reduced tolerance to errors in displacement of the second subset and resultant difficulty in controlling the displacement of the same. In addition, it becomes hard to correct comatic aberration during the compensation for image blur. If exceeding the lower limit defined in the formula (3), the second subset has its negative refractivity diminished, and this unavoidably causes a smaller ratio of a displacement of the second subset to an image motion in the imaging plane during the compensation for image blur, which requires increased displacement of the second subset, and as a result requires increased dimensions of the anti-blur compensation mechanism. In addition, it becomes hard to correct comatic aberration during the compensation for image blur.

The formula (4) provides an appropriate range of the focal length of the third subset of lens pieces in the fourth lens group. If exceeding the upper limit defined in the formula (4), the third subset of lens pieces has its positive refractivity intensified, and this leads to an increase in the entire length of the zoom lens and causes difficulty in compensating for distortion aberration. If exceeding the lower limit defined in the formula (4), the third subset has its refractive power diminished, and this leads to excessive negative spherical aberration to the extent that it becomes hard to compensate for the aberration.

In still another aspect of the present invention, the first lens group is spaced farther away from the second lens group in response to varied magnification power due to a shift of the photographing mode from wide-angle to telephoto, and accordingly, the second and third lens groups come closer to each other while the third and fourth lens groups move toward the object by different displacements therebetween.

Configured in this way, the lens optics more effectively brings about the enhanced capability of compensating aberration as mentioned above, as well as the capabilities of reducing the effective aperture of the lens group displaceable for anti-vibration compensation to permit downsizing of the anti-vibration mechanism, and of avoiding complicating the lens mechanism by virtue of the optics design only of four of the lens groups where the unit associated with an aperture stop and the anti-vibration unit can be appropriately spaced apart from each other without interference between the driving mechanisms for both the units.

Embodiment 1

A first embodiment of an anti-vibration zoom lens optics has four groups, I to IV, of lens pieces where the first lens group I include first to third lens pieces 1 to 3, the second lens group II include fourth to sixth lens pieces 4 to 6, a reference numeral 7 denotes an aperture stop, the third lens group III include eighth to tenth lens pieces 8 to 10, and the fourth lens group IV include eleventh to eighteenth lens pieces 11 to 18, respectively. The fourth lens group IV includes a IV-1 lens sub-group 41 comprising the lenses 11, 12, 13, a IV-2 lens sub-group 42 comprising the lenses 14, 15 and a IV-3 lens sub-group 43 comprising the lenses 16, 17, 18.

Optical data on the first embodiment of the anti-vibration zoom lens optics are given as follows:

| | f = 71.75~150.0~292.50 | | | |
| | Fno. = 4.1~4.95~5.75 | | | |
| | 2ω = 33.67~16.41~8.46° | | | |
| Surface No. | R | D | Nd | νd |
| --- | --- | --- | --- | --- |
| 1 | 2896.6252 | 3.1000 | 1.48749 | 70.2 |
| 2 | −274.9662 | 17.2354 | 1.00000 | |
| 3 | 71.4852 | 1.5000 | 1.79414 | 31.6 |
| 4 | 50.1146 | 8.5000 | 1.49700 | 81.5 |
| 5 | −698.1774 | D5 | 1.00000 | |
| 6 | −164.7631 | 1.2000 | 1.77250 | 49.6 |
| 7 | 55.0908 | 4.0050 | 1.00000 | |
| 8 | −46.0129 | 1.2000 | 1.63065 | 61.7 |
| 9 | 61.9044 | 3.7852 | 1.84666 | 23.8 |
| 10 | −352.9523 | D11 | 1.00000 | |
| 11 | 0.0000 | 1.5000 | 1.00000 | |
| 12 | 132.7141 | 4.0012 | 1.61800 | 63.4 |
| 13 | −108.0620 | 0.2000 | 1.00000 | |
| 14 | 52.7333 | 6.5539 | 1.49700 | 81.5 |
| 15 | −52.3709 | 1.0000 | 1.87165 | 33.5 |
| 16 | 4415.1572 | D16 | 1.00000 | |
| 17 | 36.8584 | 5.4137 | 1.48749 | 70.2 |
| 18 | −236.4356 | 1.0000 | 1.87254 | 38.4 |
| 19 | 192.3125 | 4.4462 | 1.00000 | |
| 20 | 74.3067 | 3.7217 | 1.49700 | 81.6 |
| 21 | −136.7264 | 10.6574 | 1.00000 | |
| 22 | 143.8090 | 2.8015 | 1.84344 | 23.9 |
| 23 | −52.1633 | 1.0000 | 1.85509 | 42.5 |
| 24 | 33.8334 | 8.9930 | 1.00000 | |
| 25 | 62.0252 | 2.9514 | 1.66352 | 32.9 |
| 26 | 6375.8434 | 8.0674 | 1.00000 | |
| 27 | −20.1243 | 1.5000 | 1.88300 | 40.8 |
| 28 | −48.6288 | 0.2192 | 1.00000 | |
| 29 | 112.3323 | 3.8777 | 1.52933 | 60.0 |

-continued

| | | | | |
|---|---|---|---|---|
| 30 | −87.1212 | BF | 1.00000 | |

Aperture Stop Corresponds to the 11th Surface.

| | 71.75 | 150.00 | 292.50 |
|---|---|---|---|
| D5 | 3.3174 | 30.2493 | 48.9533 |
| D11 | 42.3914 | 22.9397 | 2.0000 |
| D16 | 3.0000 | 4.6539 | 10.9622 |
| BF | 39.5207 | 57.3227 | 71.9618 |

Focal Length of Each Lens Group

| | |
|---|---|
| f1 | 130.5451 |
| f2 | −37.1833 |
| f3 | 76.9967 |
| f4 | 317.3676 |
| 41 | 59.9282 |
| f42 | −51.7383 |
| f43 | −508.2006 |

| Quantified | Incident Angle |
|---|---|
| Anti-Vibration Effect | 0.3 Degrees |
| at Wide-Angle | 0.2946 |
| at Telephoto | 0.7772 |

Embodiment 2

A second embodiment of the anti-vibration zoom lens optics has four groups, I to IV, of lens pieces where the first lens group I include first to third lens pieces 101 to 103, the second lens group II include fourth to seventh lens pieces 104 to 107, a reference numeral 108 denotes an aperture stop, the third lens group III include ninth to eleventh lens pieces 109 to 111, and the fourth lens group IV include twelfth to eighteenth lens pieces 112 to 118, respectively. The fourth lens group IV includes a IV-1 lens sub-group 141 comprising the lenses 112 to 114, a IV-2 lens sub-group 142 comprising the lenses 115, 116 and a IV-3 lens sub-group 143 comprising the lenses 117, 118.

Optical data on the second embodiment of the anti-vibration zoom lens optics are given as follows:

f = 71.75~150.0~292.00
Fno. = 4.1~4.83~5.85
2ω = 33.67~16.41~8.46°

| Surface No. | R | D | Nd | νd |
|---|---|---|---|---|
| 1 | 343.8744 | 3.8144 | 1.48749 | 70.2 |
| 2 | −343.8744 | 14.8434 | 1.00000 | |
| 3 | 65.4212 | 1.5000 | 1.69895 | 30.1 |
| 4 | 46.5711 | 8.4101 | 1.43875 | 94.9 |
| 5 | −648.0663 | D5 | 1.00000 | |
| 6 | −213.5045 | 1.2000 | 1.77250 | 49.6 |
| 7 | 56.2530 | 3.0571 | 1.00000 | |
| 8 | −55.1425 | 1.2000 | 1.77250 | 49.6 |
| 9 | 47.9635 | 4.1563 | 1.84666 | 23.8 |
| 10 | −133.8489 | 1.3243 | 1.00000 | |
| 11 | −49.3822 | 1.2000 | 1.61800 | 63.4 |
| 12 | −169.9332 | D12 | 1.00000 | |
| 13 | 0.0000 | 1.0000 | 1.00000 | |
| 14 | 79.1380 | 4.3069 | 1.88300 | 40.8 |
| 15 | −79.1380 | 0.2000 | 1.00000 | |

-continued

| | | | | |
|---|---|---|---|---|
| 16 | 56.1087 | 5.8909 | 1.49700 | 81.5 |
| 17 | −45.5752 | 1.2000 | 1.90366 | 31.3 |
| 18 | 156.9544 | D18 | 1.00000 | |
| 19 | 49.6914 | 5.0710 | 1.48749 | 70.2 |
| 20 | −64.2211 | 1.0000 | 1.91082 | 35.3 |
| 21 | 64.2211 | 0.2000 | 1.00000 | |
| 22 | 34.7404 | 5.9458 | 1.51742 | 52.2 |
| 23 | −82.3989 | 14.1294 | 1.00000 | |
| 24 | 1471.7974 | 3.0000 | 1.80610 | 33.3 |
| 25 | −27.2433 | 1.0000 | 1.77250 | 49.6 |
| 26 | 42.4849 | 3.5054 | 1.00000 | |
| 27 | 65.9840 | 3.1265 | 1.80610 | 40.7 |
| 28 | −134.3988 | 9.0657 | 1.00000 | |
| 29 | −20.1696 | 1.2000 | 1.77250 | 49.6 |
| 30 | −33.3862 | BF | 1.00000 | |

Aperture Stop Corresponds to the 13th Surface

| | 71.75 | 150.00 | 292.50 |
|---|---|---|---|
| D5 | 3.5000 | 32.0254 | 46.4397 |
| D12 | 31.2341 | 17.5696 | 2.5000 |
| D18 | 4.3009 | 2.0000 | 6.0952 |
| BF | 47.5369 | 62.6975 | 81.5776 |

Focal Length of Each Lens Group

| | |
|---|---|
| f1 | 119.5300 |
| f2 | −29.7596 |
| f3 | 54.8392 |
| f4 | 604.8530 |
| 41 | 98.7704 |
| f42 | −61.0942 |
| f43 | 168.4021 |

| Quantified | Incident Angle |
|---|---|
| Anti-Vibration Effect | 0.3 Degrees |
| at Wide-Angle | 0.3415 |
| at Telephoto | 0.8900 |

What is claimed is:

1. An anti-vibration zoom lens optics adapted to have four groups of lens pieces, a leading, first lens group of positive refractivity, a succeeding, second lens group of negative refractivity, a third lens group of positive refractivity, and a trailing, fourth lens group of positive refractivity all arranged in this order from the front end closest to the object to the rearmost;

the fourth lens group including three subsets of lens pieces, comprising a leading, first subset, a succeeding, second subset, and a trailing, third subset all arranged in this order from the front end closest to the object to the rearmost; and the second subset of lens pieces being moved perpendicular to the optical axis to compensate for blur in the imaging plane, wherein the zoom lens optics is designed to meet the requirements given in the following formulae:

$$-0.5 < f42/f43 < 0.2 \quad (3)$$

$$-1.0 < f4/f43 < 4.0 \quad (4)$$

where f4 is a focal length of the fourth lens group, f42 is the focal length of the second subset of lens pieces in the fourth lens group, and f43 is the focal length of the third subset of lens pieces in the fourth lens group.

2. The zoom lens optics according to claim 1, wherein the zoom lens optics is designed to meet the requirements given in the following formulae:

$$1 < d41/d42 < 4.5 \quad (1)$$

$$0 < f4 \quad (2)$$

where d41 is a clearance filled with air between the first and second subsets of lens pieces in the fourth lens group, d42 is the clearance filled with air between the second and third subsets of lens pieces in the fourth lens group, and f4 is a focal length of the fourth lens group.

3. The anti-vibration zoom lens optics according to claim 1, wherein the first subset of lens pieces in the fourth lens group has positive refractivity.

4. The anti-vibration zoom lens optics according to claim 1, wherein the first subset of lens pieces in the fourth lens group include two or more lens pieces of positive refractivity at least one of which is a composite lens mated with a lens piece of negative refractivity.

5. The anti-vibration zoom lens optics according to claim 1, wherein the first lens group include at least one of the lens pieces of positive refractivity that is 80 or over in Abbe number.

6. The anti-vibration zoom lens optics according to claim 1, wherein the first lens group is spaced farther away from the second lens group in response to varied magnification power due to shift of the photographing mode from wide-angle end to telephoto end, and accordingly, the second and third lens groups come closer to each other while the third and fourth lens groups move toward the object by different displacements therebetween.

* * * * *